US012793969B2

(12) United States Patent
Hansen et al.

(10) Patent No.: US 12,793,969 B2
(45) Date of Patent: Nov. 10, 2026

(54) CURED CONDUCTIVE BINDER MATERIAL, USES THEREOF AND METHODS OF FORMING SAME

(71) Applicant: ANTEO ENERGY TECHNOLOGY PTY LIMITED, Eight Mile Plains (AU)

(72) Inventors: Kai-Anders Hansen, Runcorn (AU); Chang-Yi Huang, Calamvale (AU); Nobuyoshi Joe Maeji, Stones Corner (AU); Manuel Christoph Wieser, Rochedale South (AU)

(73) Assignee: ANTEO ENERGY TECHNOLOGY PTY LTD, Queensland (AU)

( * ) Notice: Subject to any disclaimer, the term of this patent is extended or adjusted under 35 U.S.C. 154(b) by 933 days.

(21) Appl. No.: 17/917,764

(22) PCT Filed: Apr. 8, 2021

(86) PCT No.: PCT/AU2021/050323

§ 371 (c)(1),
(2) Date: Oct. 7, 2022

(87) PCT Pub. No.: WO2021/203170

PCT Pub. Date: Oct. 14, 2021

(65) Prior Publication Data

US 2023/0170468 A1 Jun. 1, 2023

(30) Foreign Application Priority Data

Apr. 8, 2020 (AU) ................................ 2020901117

(51) Int. Cl.

*H01M 4/36* (2006.01)
*C09C 1/28* (2006.01)

(Continued)

(52) U.S. Cl.

CPC ............... *H01M 4/366* (2013.01); *C09C 1/28* (2013.01); *C09C 1/46* (2013.01); *C09C 3/006* (2013.01);

(Continued)

(58) Field of Classification Search

CPC ...... H01M 4/366; H01M 4/386; H01M 4/587; H01M 4/60; H01M 4/622; H01M 4/364;

(Continued)

(56) References Cited

U.S. PATENT DOCUMENTS

2016/0351909 A1 12/2016 Bittner

FOREIGN PATENT DOCUMENTS

KR 20130083211 A 7/2013
WO H09198926 A 7/1997

(Continued)

OTHER PUBLICATIONS

International Preliminary Report on Patentability issued in International Application No. PCT/AU2021/050323, mailed Oct. 6, 2022.

(Continued)

*Primary Examiner* — Andrew J. Oyer
(74) *Attorney, Agent, or Firm* — Sheridan Ross P.C.

(57) ABSTRACT

The present invention relates to a method of forming a cured conductive binder material, to a method of forming a curable binder formulation, to a curable binder formulation, to a cured conductive binder material and to an electrochemical cell. In one embodiment, the method of forming a cured conductive binder material includes the steps of: (i) providing a liquid formulation comprising a liquid carrier, at least one active material, at least one polymeric binder and at least one modified metal coordination complex; and (ii) curing the liquid formulation of step (i), to thereby form a cured conductive binder material.

12 Claims, 12 Drawing Sheets

(51) Int. Cl.

| | |
|---|---|
| ***C09C 1/46*** | (2006.01) |
| ***C09C 3/00*** | (2006.01) |
| ***C09C 3/08*** | (2006.01) |
| ***C09C 3/10*** | (2006.01) |
| ***H01M 4/38*** | (2006.01) |
| ***H01M 4/587*** | (2010.01) |
| ***H01M 4/60*** | (2006.01) |
| ***H01M 4/62*** | (2006.01) |

(52) U.S. Cl.

CPC .................. *C09C 3/08* (2013.01); *C09C 3/10* (2013.01); *H01M 4/386* (2013.01); *H01M 4/587* (2013.01); *H01M 4/60* (2013.01); *H01M 4/622* (2013.01); *C01P 2004/03* (2013.01); *C01P 2004/64* (2013.01); *C01P 2006/40* (2013.01)

(58) Field of Classification Search

CPC ........... H01M 10/0525; H01M 4/1395; H01M 4/133; H01M 4/134; H01M 4/1393; H01M 4/483; H01M 4/624; H01M 4/625; H01M 4/0409; H01M 4/0435; H01M 4/382; H01M 4/387; H01M 4/583; C09C 1/28; C09C 1/46; C09C 3/006; C09C 3/08; C09C 3/10; C01P 2004/03; C01P 2004/64; C01P 2006/40; Y02E 60/10; C01B 32/21; C01B 33/00; B01J 13/006; C08L 33/02; C08L 1/28; C08L 5/04; B82Y 40/00; C08F 8/42; C08J 3/24; C08J 2333/02; C08J 3/07; C08J 2301/28; C08J 2305/04; C08K 3/04; C08K 3/36; C08B 37/0084

See application file for complete search history.

(56) References Cited

FOREIGN PATENT DOCUMENTS

| | | | | |
|---|---|---|---|---|
| WO | WO 2008/147137 A2 | | 12/2008 | |
| WO | WO 2015/021509 | | 2/2015 | |
| WO | WO 2016/168892 | | 10/2016 | |
| WO | WO 2017/073467 | | 5/2017 | |
| WO | WO-2017165916 A1 | * | 10/2017 | ........... H01M 4/525 |

OTHER PUBLICATIONS

International Search Report issued in International Application No. PCT/AU2021/050323, mailed May 25, 2021.

Written Opinion of the International Searching Authority issued in International Application No. PCT/AU2021/050323, mailed May 25, 2021.

International Search Report and Written Opinion for International (PCT) Patent Application No. PCT/AU2021/050322, dated May 25, 2021, 11 pages.

International Preliminary Report on Patentability for International (PCT) Patent Application No. PCT/AU2021/050322, dated Oct. 6, 2022, 7 pages.

Official Action for U.S. Appl. No. 17/917,741, dated Jun. 25, 2025 12 pages.

Official Action for U.S. Appl. No. 17/917,741, dated Mar. 30, 2026 16 pages.

* cited by examiner

CURED CONDUCTIVE BINDER MATERIAL, USES THEREOF AND METHODS OF FORMING SAME

CROSS REFERENCE TO RELATED APPLICATIONS

The present application is a § 371 National Phase application based on PCT/AU2021/050323 filed Apr. 8, 2021, which claims the benefit of AU application No. 2020901117 filed Apr. 8, 2020 the subject matter of each of which is incorporated by reference in their entirety.

FIELD OF THE INVENTION

The invention relates to a method of forming a cured conductive binder material, to a method of forming a curable binder formulation, to a curable binder formulation, to a cured conductive binder material and to an electrochemical cell. In one embodiment, the invention relates to a method of forming a cured conductive binder material comprising at least one polymeric binder, at least one active material and at least one modified metal coordination complex as a cross-linking agent forming conductive networks across the material, particularly following curing of related formulations.

BACKGROUND OF THE INVENTION

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

Polymeric binders in electrodes play an essential role in maintaining a cohesive network of active materials and conductive additives and in providing for strong adhesion of the electrode matrix to the current collector. These requirements can be especially challenging in the development of electrodes, such as silicon anodes, for high performance Li-ion batteries. Silicon undergoes large volume changes of around 300% during cycling which leads to a progressive loss of cohesion and adhesion, and an ensuing loss of electrical integrity within the electrode. To maintain long-term mechanical and electrical integrity, new generation binders must be able to address undesirable outcomes such as the disintegration of silicon particles, the exfoliation of the polymeric binder at the particle interface, the breaking up of the electrode matrix and delamination off the current collector. Ideally, mechanical and electrical integrity will be achieved using a minimal amount of binder to maximise the total cell capacity. It is also highly preferable that any such binder or additive to the formulation used to make the electrode should not require a significant change in current manufacturing processes and so be a cost-effective approach.

One particular class of binders used to mitigate against changing volumes, such as in silicon anodes, are supramolecular polymeric binders or so-called "reversible or dynamic chemistries" which utilise polymers having the potential for hydrogen-bonding, charge-charge, metal-ligand, host-guest and other similar interactions. By way of example, polyacrylic acid (PAA), carboxymethyl cellulose (CMC) and other polymers containing carboxylic acid groups have been used to protect silicon particles through hydrogen bonding with Si—OH groups on the material surface. However, cycling stress due to volume expansion/contraction is not just localised near the silicon active particles but also propagates through the entire electrode matrix. While these carboxy acid polymer binders form a three-dimensional hydrogen-bonded network with each other, they are not adequate to maintain optimal mechanical and electrical integrity under cycling stress.

Various studies into the necessary reversible or dynamic interactions have shown that they can be broadly classed into three categories in terms of their reversibility and strength: weak supramolecular interactions; strong supramolecular interactions; and covalent binding (Chemical Society Reviews 47(6): 2145-2164, 2018). The consensus view in the art appears to be that covalent binding cannot recover or 'self-heal' under the stresses of electrical cycling and that stronger supramolecular interactions are preferred over weaker bonding interactions.

As an example of approaches taken in the art, certain metal ions have been included with certain polymeric binders to augment binding strength including a finding that alginate, and its derivatives, form calcium-mediated "egg-box" electrostatic cross-linking which improves toughness, resilience, and electrolyte desolvation of the alginate binder (Phys. Chem. Chem. Phys., 2014, 16, pp. 25628). Consequently, the improved mechanical properties of the calcium-alginate binder, compared to the sodium alginate binder and other commercial binders, extends the lifetime and increases the capacity of silicon-based anodes. However, such a calcium-containing slurry when used to form an electrode proved too viscous and heterogeneous to be processable and so non-standard methods such as spraying of or dipping into an appropriate calcium solution of the preformed anode film was required. The unique molecular structure and chemistry of alginate is highlighted to account for the performance improvement as a binder, and although there is $Ca^{2+}$ mediated intra- and inter-molecular cross-linking of alginate, the interaction with silicon particles is still provided separately by hydrogen-bonding with the alginate carboxylic groups. This implies that further increasing the amount of $Ca^{2+}$ ions may be detrimental to electrode performance as it would limit the available carboxylic groups for hydrogen-bonding to the silicon particles and so a delicate balance must be struck.

Another example of a polymer and cross-linker used for electrode formation are polyvinyl alcohols in combination with metal borates, as described in US2018/0108913A1. Similar to the above calcium-alginate approach, the unique molecular structure and chemistry of polyvinyl alcohol is highlighted to account for the performance improvement as a polymeric binder and on mixing with borate, the solution becomes viscous as the cross-linking reaction proceeds instantaneously. While the outcome shows electrochemical benefits, the situation recommended is under limited material constraints, essentially as with the calcium-alginate example.

Apart from cross-linking of the polymeric binder with itself, it would also be useful to enhance the cross-linking of the polymeric binder with other components, such as silicon and/or carbon particles within the electrode. However, hydrogen-bonding or charge-charge interactions are still not sufficiently strong enough to meet many commercial requirements. As previously discussed, mechanical and electrical integrity need to be maintained across the entire electrode material and this includes an array of different materials, each often having very different surface properties. Obviously, every material will not have the necessary surface chemistry to obtain the desirable strong supramolecular interaction at every interface within the electrode. Any additional synthetic steps required to enable the desired interaction to take place will add greater complexity to the commercial viability of the process.

In some embodiments, the present invention addresses one or more of the aforementioned shortcomings of the prior art or offers a useful commercial alternative.

SUMMARY OF THE INVENTION

In a first aspect, although not necessarily the broadest aspect, there is provided a method of forming a cured conductive binder material including the steps of:

(i) providing a liquid formulation comprising a liquid carrier, at least one active material, at least one polymeric binder and at least one modified metal coordination complex; and (ii) curing the liquid formulation of step (i), to thereby form a cured conductive binder material.

In one embodiment, there is provided a method of forming a cured conductive binder material including the steps of:

(i) providing a liquid formulation comprising a liquid carrier, at least one active material, at least one polymeric binder and at least one modified metal coordination complex; and (ii) curing the liquid formulation of step (i), to thereby form a cured conductive binder material comprising dative bonds between the metal of the at least one modified metal coordination complex and both the at least one active material and the at least one polymeric binder.

In a second aspect, there is provided a curable binder formulation comprising:

(i) a liquid carrier;

(ii) at least one active material;

(iii) at least one polymeric binder; and (iv) at least one modified metal coordination complex.

In one embodiment of the second aspect, the curable binder formulation is substantially homogeneous throughout its extent.

In one embodiment of the second aspect, there is provided a curable binder formulation comprising:

(i) a liquid carrier;

(ii) at least one active material;

(iii) at least one polymeric binder; and (iv) at least one modified metal coordination complex, wherein the curable binder formulation is substantially homogeneous throughout its extent and is curable to form dative bonds between the metal of the at least one modified metal coordination complex and both the at least one active material and the at least one polymeric binder.

In a third aspect, the invention provides a method of forming a curable binder formulation including the steps of:

(i) providing a liquid carrier;

(ii) adding to the liquid carrier; at least one active material, at least one polymeric binder and at least one modified metal coordination complex; and (iii) mixing the liquid carrier, at least one active material, at least one polymeric binder and at least one modified metal coordination complex, to thereby form the curable binder formulation.

In one embodiment of the third aspect, the curable binder formulation is substantially homogeneous throughout its extent.

In one embodiment of the third aspect, there is provided a method of forming the curable binder formulation of the second aspect including the steps of:

(i) providing a liquid carrier;

(ii) adding to the liquid carrier; at least one active material, at least one polymeric binder and at least one modified metal coordination complex; and (iii) mixing the liquid carrier, at least one active material, at least one polymeric binder and at least one modified metal coordination complex, to thereby form the curable binder formulation of the second aspect, said formulation being substantially homogeneous throughout its extent and curable to form dative bonds between the metal of the at least one modified metal coordination complex and both the at least one active material and the at least one polymeric binder.

In a fourth aspect, the invention resides in a cured conductive binder material comprising at least one active material, at least one polymeric binder, and at least one metal coordination complex, the at least one active material and at least one polymeric binder being interconnected by the at least one metal coordination complex, and wherein the conductive binder material comprises dative bonds between the metal of the at least one metal coordination complex and both the at least one active material and the at least one polymeric binder and is substantially homogeneous throughout its extent.

In a fifth aspect, the invention resides in a curable binder formulation produced according to the method of the third aspect.

In a sixth aspect, the invention resides in a cured conductive binder material formed by curing the curable binder formulation of the second aspect or by curing the curable binder formulation prepared according to the method of the third aspect.

In a seventh aspect, the invention resides in a cured conductive binder material produced according to the method of the first aspect.

In an eighth aspect, the invention resides in a method of fabricating an electrode including the step of fabricating the electrode from the cured conductive binder material formed by the first aspect; or from the curable binder formulation of the second aspect; or from the curable binder formulation produced according to the method of the third aspect; or from the cured conductive binder material of the fourth aspect.

In a ninth aspect, there is provided an electrochemical cell including: an anode, a cathode, and an electrolyte arranged between the anode and the cathode; wherein at least one of the anode or the cathode comprises a cured conductive binder material which is formed by: the method of the first aspect; or by curing the curable binder formulation of the second aspect; or by curing the curable binder formulation prepared according to the method of the third aspect; or which is the cured conductive binder material of the fourth aspect; or which is formed by the sixth or seventh aspects or wherein at least one of the anode or the cathode is an electrode formed by the method of the eighth aspect.

The various features and embodiments of the present invention, referred to in individual sections above apply, as appropriate, to other sections, mutatis mutandis. Consequently, features specified in one section may be combined with features specified in other sections as appropriate.

Figure 1:
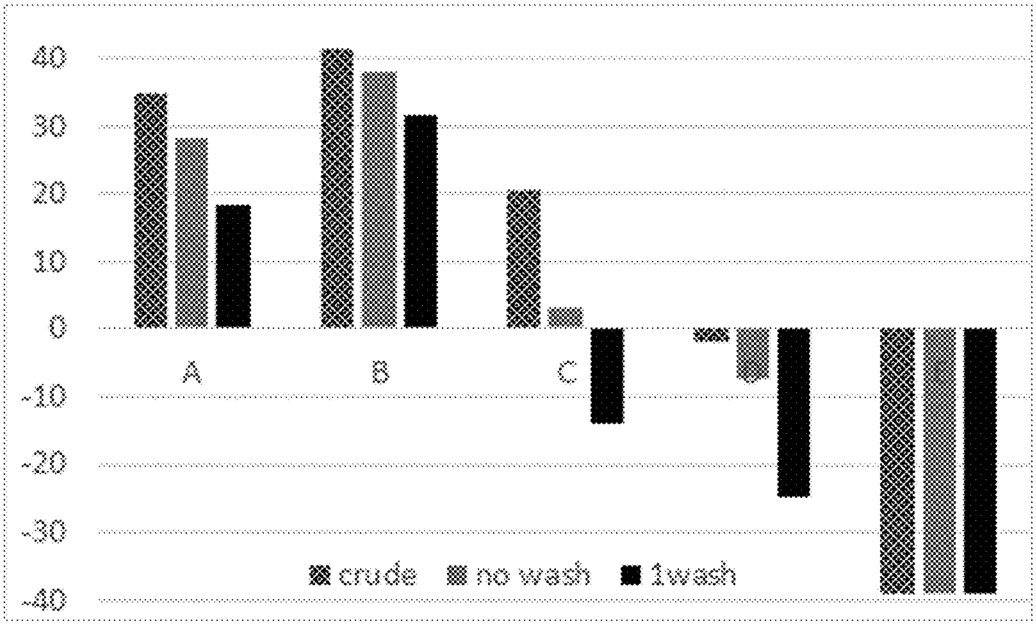
FIG. 1 shows the zeta potential for silicon nanoparticles activated with chromium perchlorate-based oligomeric metal complexes: A—pH 4.5; B—acetate capped at pH 4.5; C—at pH 3.0; D—acetate capped at pH 3.0; and E—Control. As shown by zeta potential measurements, when particles are treated with different metal coordination complexes, there is coordination of the metal complexes to the particle and the strength varies with capping group and pH conditions.

Further aspects of the present invention and further embodiments of the aspects described in the preceding paragraphs will become apparent from the following description, given by way of example and with reference to the accompanying drawings.

DETAILED DESCRIPTION OF THE EMBODIMENTS

The present invention is predicated, at least in part, on the understanding that anions that interact with cations range from non-coordinating (weakly coordinating) to stronger coordinating anions. The strength of this coordination varies with the cation, its oxidation state, and the structure of the anion. Some anions are known to be excellent leaving groups easily replaced by other ligands under mild conditions while others, once coordinated are far more difficult to exchange. As well, certain metal cations or coordination complexes can stably interact with virtually any species capable of donating an electron pair to form anionic, cationic or neutral species. Importantly, by then modifying the reactivity of such metal coordination complexes, it is possible to have a metal coordination complex that is slow to react due to pre-existing ligands in the complex but over time, will exchange and coordinate with all, or at least many, of the components of an electrode matrix in one step. By allowing such modified metal coordination complexes to be optimally contacted in a liquid formulation which comprises active material(s) and polymeric binder(s), the modified reactivity may be such that dative bonds with the metal coordination complexes may be formed in a controlled manner between the uniformly mixed active material(s) and polymeric binder(s). This controlled reactivity or curing provides for a homogeneous electrically connected network of these components to be formed. The modification of the reactivity of the metal coordination complexes is therefore key as it is believed that a homogeneous interconnected network of the components cannot otherwise be achieved in such a simple and reliable manner. It has been surprisingly found that this can be achieved without negatively impacting upon the viscosity or other processing variables of the working electrode slurry and upon coating the current collector and subsequent heating (not necessarily to dryness) the system cures and locks in the preferred cross-linked network structure, including bonding to the current collector itself, if present.

This approach can deliver a number of benefits including: effectively providing for a “drop-in solution” that can be added to a slurry mix at any stage without significantly changing the viscosity of the slurry or any other parameter that might lead to poor processability; cross-linking a wide range of polymeric binders; also cross-linking the polymeric binder to surfaces of silicon, carbon, graphite particles and the like; additionally cross-linking to copper, aluminum and other current collector active materials and even separators; improving the elasticity or flexibility of the subsequently formed binder material; increasing desirable interactions between the components of the electroactive material; and, in one embodiment, improving the binding force of the silicon anode to the current collector. This provides for electrodes, and other conductive composite materials, which are much better equipped to deal with the physical challenges of electrical cycling.

Approaches of the prior art, as discussed, have not considered the benefits of tuning the pre-existing anions on the metal complex and tend to focus on forming bonds between metal ions and only one component of an electrode, such as forming layers on the surface of silicon particles only or cross-linking of polymeric binders. For example, none provide a simple and robust means for forming dative bonds in a homogeneous manner between the metal of the metal coordination complexes and both active materials and polymeric binders within the electrode, as well as dative bonds to the current collector metal upon casting and curing, to give a strong conductive cross-linked electrode.

In a first aspect, although not necessarily the broadest aspect, the invention resides in a method of forming a cured conductive binder material including the steps of:

(i) providing a liquid formulation comprising a liquid carrier, at least one active material, at least one polymeric binder and at least one modified metal coordination complex; and (ii) curing the liquid formulation of step (i), to thereby form a cured conductive binder material.

In one embodiment, the cured conductive binder material comprises dative bonds between the metal of the at least one modified metal coordination complex and both the at least one active material and the at least one polymeric binder.

In one embodiment, the at least one modified metal coordination complex is at least one modified oligomeric metal coordination complex.

The terms “cured conductive binder material”, “conductive binder material” and “binder material”, are intended to encompass any mixture of metallic, intermetallic, metalloids, carbon, and/or ceramic active material(s) with one or more polymeric binders and metal coordination complexes, as described herein. The material will always comprise a polymeric binder material which, in the case of electrode binder materials, plays a role in the physical stability and connectivity of the electrode matrix. When mixed initially to form uniformly dispersed suspensions, slurries or blends prior to formation of the final binder material, the mixtures are referred to herein as curable binder formulations. An electrode matrix or composite material forming part thereof and being suitable for forming an electrode, and comprising a suitable polymeric binder, may be a preferred cured conductive binder material.

In the present specification and claims, the word ‘comprising’ and its derivatives including ‘comprises’ and ‘comprise’ include each of the stated integers but does not exclude the inclusion of one or more further integers.

The liquid carrier may be an aqueous or organic solvent, or mixture thereof, or the liquid carrier may be a liquid additional active material. In embodiments, the liquid carrier has at least some aqueous component.

The nature of the liquid carrier is not particularly limiting on the scope of the present invention as a wide array of liquid solvents will be appropriate for different active materials. In certain embodiments, liquid (at room temperature such as, for example, 21° C.) ketones, alcohols, aldehydes, halogenated solvents and ethers may be appropriate. In one preferred embodiment, an alcohol or aqueous/alcohol liquid carrier is preferred. Such alcohols as may be appropriate include methanol, ethanol, and isopropanol and may or may not contain an amount of water to improve the solubility of one or more of the components. The liquid carrier may be an aqueous solution. The liquid carrier may be water or an alcohol. The alcohol may be methanol, ethanol, propanol, isopropanol or butanol. In one embodiment, the liquid carrier is water or isopropanol. In one embodiment, the liquid carrier is water.

The term "active material", as used herein, is intended to encompass any material which has an active functional role in a process or application within some larger composite material such as the present binder materials. In one non-limiting example, the active material may be a constituent part of an electrode that is involved in electrochemical charge and discharge reactions. Therefore, in embodiments, at least one active material will contribute significantly to conductivity when incorporated within an electrode material. The active material may, in certain embodiments, also be referred to as an intercalation material or compound, which is a material or compound that can undergo both intercalation and deintercalation of an electrolyte ion to effect charge and discharge cycles. The active material may, in embodiments, be a particulate active material, or a nanoparticulate active material. In one non-limiting example, the active material may be a material such as silicon and/or graphite and/or other carbon-based particles, useful in the formation of electrodes. In other embodiments, the active material may include surface modified active materials and/or preformed composite particles comprising aggregates or clusters of smaller particles. In embodiments, the at least one active material may also be a current collector or current collector material including, but not limited to, copper and aluminium. In embodiments wherein the current collector is an active material then it may be considered an additional active material, such as a second, third, fourth or fifth active material and so at least one other active material, such as silicon and/or carbon, will always be present. Any references to homogeneous in relation to the distribution of active material will be understood not to relate to the additional current collector active material as it will typically be present in the form of a sheet or foil of the relevant metal.

In embodiments, the surface of the active material includes a nitrogen, oxygen, sulfur, hydroxyl, or carboxylic acid species having a lone pair of electrons for forming a dative bond. Preferably, the surface includes an oxygen species. Oxygen species are preferred as generally, the surface of the active material can be easily oxidised to include an oxide layer or may already be considered an oxide. Thus, in a preferred embodiment the active material surface is, or is adaptable to become, an oxide surface.

In embodiments, the active material (or at least one active material if more than one is present) is selected from the group consisting of metals, intermetallic compounds, metalloids, metal oxides, clays, carbon-based nano- and micron-sized particles, and ceramics. In embodiments, the active material (or at least one active material if more than one is present) is selected from the group consisting of metals, intermetallic compounds, metalloids, metal oxides, clays, carbon-based nano- and micron-sized particles (or carbon-based nanoparticles), graphite and ceramics. In certain embodiments, silicon is a preferred metalloid. In one embodiment, the metal or metal oxide may be selected from the group consisting of gold, mixed silver/gold, copper, zinc oxide, tin and aluminium. In one embodiment, the metal or metal oxide may be in the form of nanoparticles. In embodiments, gold and magnetite nanoparticles are preferred metal and metal oxides. In embodiments wherein at least one additional active material is a current collector, or component thereof, then it may be selected from copper, aluminium, silver, platinum or gold. In embodiments wherein at least one additional active material is a current collector, or component thereof, then it may be selected from copper or aluminium.

In one embodiment, the at least one active material is selected from silicon, silicon-containing materials (its oxides, composites and alloys), tin, a tin-containing material (its oxides, composites and alloys), germanium, germanium-containing material (its oxides, composites and alloys), carbon, and graphite. If the cured conductive binder material is being formed for use in anode production then the active material is typically selected from silicon, silicon containing materials (its oxides, composites and alloys), tin, a tin containing material (its oxides, composites and alloys), germanium, germanium containing material (its oxides, composites and alloys), carbon, and graphite. Preferably, when the electrode is an anode, the active material comprises silicon and/or carbon. Silicon may be in the form of pure silicon, its various oxides (which may be defined as $SiO_x$ and including SiO, $SiO_2$, etc.), its alloys (Si—Al, Si—Sn, Si—Li, etc.), and composites (carbon coated Si, and other alternative carbon-Si and graphite-Si compositions, etc.). It is preferred that the carbon is in the form of graphite, super-P carbon, graphene, carbon nanotubes, carbon nanofibers, acetylene carbon black, Ketjenblack (KB); and other carbon-based materials.

In one embodiment, the active material comprises silicon. References herein to 'silicon' may include silicon dioxide ($SiO_2$).

In one embodiment, the at least one active material is selected from those comprising sulphur, $LiFePO_4$ (LFP), mixed metal oxides which include cobalt, lithium, nickel, iron and/or manganese, phosphorus, aluminum, titanium and carbon. If the cured conductive binder material is being formed for use in cathode production then the active material (or at least one active material if more than one is present) may be selected from those comprising sulphur, $LiFePO_4$ (LFP), mixed metal oxides which include cobalt, lithium, nickel, iron and/or manganese, phosphorus, aluminum, titanium and carbon. It is preferred that the carbon is in the form of one or more carbon particles selected from graphite, super-P carbon, graphene, carbon nanotubes, carbon nanofibers, acetylene carbon black, Ketjenblack (KB); and other carbon-based materials.

In embodiments wherein there is to be at least a first and a second active material incorporated within the conductive composite formulation, it may be preferred that there is a first active material comprising silicon and a second active material comprising carbon, both as defined above. A third, fourth or further active material may, in embodiments, be included in the form of a current collector, as described above, and/or selected from all of the active material types defined above.

It will be appreciated from the disclosure herein that the nature of the active material is not particularly limited and any such material used in the prior art may be appropriate so long as it is capable of binding to a modified metal coordination complex. When the cured conductive binder material is being prepared for use in electrodes, or other battery materials, then the active material(s) may be selected from any of those currently in use for lithium ion batteries, and more particularly from those employing a silicon-based anode.

When the active material is a particle or in a similar dispersed form then the term 'particle' is generally intended to encompass a range of different shaped materials. The particle may be of any shape, such as but not limited to, spheres, cylinders, rods, wires, tubes. The particles may be porous or non-porous.

When the at least one active material is in nanoparticulate form the nanoparticles may encompass a number average particle diameter of from about 1 nm to about 1000 nm. Preferably, the number average particle diameter is at least 10 nm. More preferably, the nanoparticles have a number average particle diameter of at least 30 nm. Even more preferably, the nanoparticles have a number average particle diameter of at least 50 nm. Most preferably, the nanoparticles have a number average particle diameter of at least 70 nm. Each of these lower end diameters can be considered to be paired in an average particle diameter range with an upper limit selected from 1000 nm, 900 nm, 800 nm, 700 nm, 600, nm, 500 nm, 400 nm, 300 nm and 200 nm.

When the at least one active material is in micron sized particulate form, the number average particle diameter is of up to 50,000 nm. More preferably, the particles have a number average particle diameter of up to 10,000 nm. Even more preferably, the particles have a number average particle diameter of up to 5000 nm. Most preferably, the particles have a number average particle diameter of up to 3000 nm.

It will be understood that the particles have a number average diameter that has a lower range selected from any one of about 1, 10, 30, 50, or 70 nm; and an upper range that is selected from any one of about 50,000, 10,000, 5000, or 3000 nm. In embodiments, the number average diameter is within the range of 100 nm to 5,000 nm.

The modified metal coordination complex can coordinate to any electron-donating groups on the surface of the at least one active material. Even active materials purported not to have electron-donating groups often have such groups as a consequence of our oxygenated atmosphere. Accordingly, the active materials include a surface having electron-donating groups, and the metal ions of the modified metal coordination complex will become bound via a dative bond to these electron-donating groups. Suitable electron-donating surface moieties include oxides.

Where the active materials have either too many or too few (less reactive) electron-donating groups, they may be further modified to match the reactivity of other active materials to the modified metal coordination complex. In this manner, it may be further possible to adjust ratios of different active materials as required.

In the rare instances where there are little or no electron-donating groups on the surface of the active material nanoparticles, current collectors and the like and/or the surface is more hydrophobic in character, at least some ligands of the modified metal coordination complex (or the modified oligomeric metal coordination complex) can be hydrophobic ligands (R-X), where X coordinates to the metal ion and so where X may be any electron-donating group that is able to form a coordination bond with the metal ion. The group "R" may be independently selected from alkyl, heteroalkyl, alkenyl, alkynyl, cycloalkyl, heterocycloalkyl, alkylcycloalkyl, heteroalkylcycloalkyl, aryl, heteroaryl, aralkyl and heteroaralkyl, which groups are optionally substituted. In accordance with this embodiment, "R" is preferred to have more hydrophobic character. Further, the R group may also incorporate moieties selected from a lithium ion conducting polymer, a conjugated diene-containing group, a polyaromatic- or heteroaromatic-containing group, a nitrogen-containing group, an oxygen-containing group, or a sulfur-containing group. Preferably the "R" group is a short polymer such as shorter versions of polymeric binders such as polyvinylidene fluoride (PVDF), poly(styrene butadiene), polyethylene and its copolymers, polypropylene and its co-polymers, and polyvinyl chloride.

In such instances wherein at least some ligands of the modified metal coordination complex are hydrophobic ligands (R-X), it will be necessary to select the ratio of the R group to the available coordination potential of the modified metal coordination complex. This selection will allow both coordination and hydrophobic interactions with the surface of the active material but still provide for remaining coordination potential.

As mentioned, the use of hydrophobic ligands (R-X as defined above) will be relatively uncommon and particularly so when anode materials are being prepared. It may be more common with cathode materials due to the more regular use of organic solvents. Therefore, in one embodiment wherein the active material is as described above for either anode or cathode applications, then the metal coordination complex does not comprise a substantial number of hydrophobic ligands. That may mean that less than 80%, 60%, 40%, 30%, 20% or 10% of the possible ligand binding capacity of the modified metal coordination complex is taken up by such hydrophobic ligands. In embodiments, there may be substantially no hydrophobic ligands on the modified metal coordination complex. The modified metal coordination complex may be a modified oligomeric metal coordination complex.

In embodiments, the modified metal coordination complex (or modified oligomeric metal coordination complex) may be made to include both capping groups and hydrophobic substitutions. It will be clear to the skilled addressee that the proportions of the hydrophobic ligand substitutions will change the solubility of the metal coordination complex to different solvents, change the binding properties to different active materials and influence the choice of the preferred polymer binders being used to those more hydrophobic in nature.

It will also be appreciated that the degree of modification, for example the extent of capping of the modified metal coordination complex (or modified oligomeric metal coordination complex), and the pH of the reaction can be controlled in tandem to modify the reactivity to the selected at least one active material and the at least one polymeric binder.

The liquid formulation may comprise one or more additional active materials, as is required, and each additional active material thereof may be selected from the same groups and materials described previously. For example, the liquid formulation may further comprise a second active material, third active material, a fourth active material, a fifth active material and so on. At least one or more of these, preferably the majority of them or all, will be appropriate to bond with the modified metal coordination complex within the formulation.

The at least one polymeric binder may be any natural or synthetic polymer capable of forming coordinate bonds with the at least one modified metal coordination complex. It will be appreciated that the end use of the cured conductive binder material may dictate that there may be first, second, third and even further polymeric binders to be exposed to the at least one modified metal coordination complex. In such situations any polymeric binder combinations may be appropriate. In one embodiment, each polymeric binder in a combination may be sufficiently reactive with the metal of the at least one modified metal coordination complex to form dative bonds. This will generally always be the case so long as the polymeric binder has sufficient electron-donating groups.

In embodiments, the at least one polymeric binder may be any one or more polymers which possess sufficient molecular mass or electron-donating groups to bond with the at least one modified metal coordination complex whether in the absence or presence of capping groups as discussed below. It is an advantage that the modified metal coordination complexes can be bonded to a wide variety of polymers.

The at least one polymeric binder(s) may be hydrophilic or hydrophobic or at least partially hydrophilic or partially hydrophobic.

Representative polymers that are hydrophobic or partially hydrophobic may be selected from the group consisting of poly(ester amide), polycaprolactone (PCL), poly(L-lactide), poly(D,L-lactide), poly(lactides), polylactic acid (PLA), poly(lactide-co-glycolide), poly(glycolide), polyhydroxyalkanoate, poly(3-hydroxybutyrate), poly(4-hydroxybutyrate), poly(3-hydroxyvalerate), poly(3-hydroxybutyrate-co-3-hydroxyvalerate), poly(3-hydroxyhexanoate), poly(4-hydroxyhexanoate), mid-chain polyhydroxyalkanoate, poly (ortho ester), polyphosphazenes, poly(phosphoester), poly (tyrosine derived carbonates), poly(methyl methacrylate), poly(methacrylates), poly(vinyl acetate), polyacrylonitrile, polyisoprene, polyaniline, polystyrene, polystyrene sulfonate, poly(3,4-ethylene dioxythiophene), polyphenols, polydopamine, polyurethane, poly(2-hydroxyethyl methacrylate and copolymers comprising any two or more of these polymers such as poly(ethylene-co-vinyl acetate), poly (ethylene-co-vinyl alcohol) and the like.

Representative hydrophilic polymers may be selected from the group consisting of polymers and co-polymers of hydroxyethyl methacrylate (HEMA), PEG acrylate (PEGA), PEG methacrylate, 2-methacryloyloxyethylphosphorylcholine (MPC) and n-vinyl pyrrolidone (VP), Polyvinyl pyrrolidone (PVP), Polyvinyl alcohol (PVA), carboxylic acid bearing monomers such as methacrylic acid (MA), acrylic acid (AA), polyacrylic acid (PAA), hydroxyl bearing monomers such as HEMA, hydroxypropyl methacrylate (HPMA), hydroxypropylmethacrylamide, vinyl alcohol, alkoxymethacrylate, alkoxyacrylate, and 3-trimethylsilylpropyl methacrylate (TMSPMA), hydroxy functional poly(vinyl pyrrolidone), polyalkylene oxide, cellulose, carboxymethyl cellulose, maleic anhydride copolymers, nitrocellulose, dextran, dextrin, sodium hyaluronate, hyaluronic acid, alginic acid, tannic acid, elastin and chitosan and cross-linked polymers comprising any two or more of these polymers.

In embodiments, all such hydrophilic polymers as recited above, as appropriate, can also be also derivatised with catechol additives such as dopamine.

In embodiments wherein the cured conductive binder material to be formed is for battery applications, then preferred polymeric binders are those comprising oxygen species selected from acrylate, carboxyl, hydroxyl, and carbonyl moieties. However, other polymers without these groups may also be useful depending on the specific criteria, for example suitable polymers may include polyvinylidene fluoride (PVDF), styrene butadiene rubber (SBR), and ethylene propylene diene monomer rubber (EPDM). Particularly preferred binders are selected from polyvinylpyrrolidone, carboxymethyl cellulose (CMC), polyacrylic acid (PAA), poly(methacrylic acid), maleic anhydride copolymers including poly(ethylene and maleic anhydride) copolymers, polyvinyl alcohol, alginic acid salts, carboxymethyl chitosan, natural polysaccharide, Xanthan gum, Guar gum, Arabic gum, alginate, and polyimide. Most preferably, the binder is PAA and/or alginate and/or CMC. In an alternative embodiment, where it is desirable that the binder moiety contains a nitrogen atom, a suitable polymer is polyaniline.

In certain embodiments, the at least one polymeric binder forming the network structure within the binder material to be formed, may be or include polyacrylic acid, carboxymethyl cellulose, alginate, polyvinyl alcohol, maleic anhydride copolymers or their combinations and including variations on each of these having different molecular weight ranges, branching structures, concentrations, formulation pH and the like.

In some embodiments, the proportions of the modified metal coordination complex (or modified oligomeric metal coordination complex) may change according to the type/reactivity of the at least one modified metal coordination complex (or modified oligomeric metal complex).

In embodiments, where the active material is a silicon particle, the total surface area to which the modified metal coordination complex (or modified oligomeric metal coordination complex) binds may be dramatically different between a nanoparticle and a micron particle for the same weight used. If other active materials including porous or semi-permeable particles are used, it may also affect the relative proportions of the components to the modified metal coordination complex (or modified oligomeric metal coordination complex). It will also be appreciated that the potential for coordination may be affected by the manufacturing history such as the degree of oxygenation of some batch of silicon particle.

While a ratio of one active material to a modified metal coordination complex can be easily described, these interactions, prior to curing, are reversible in nature, and once there are multiple components, there is competition between the at least one active material and at least one polymeric binder for the available modified metal coordination complex (or modified oligomeric metal coordination complex). While a linear relationship is possible with simple combinations, with more complex systems, the relationship may be more complex.

In embodiments, the polymer binder:modified metal coordination complex ratio is in the range of 1000:1, 500:1, 300:1, 150:1, 50:1, 25:1, 10:1, 5:1 and 1:1. Such ratios in the range of 360:1, 170:1. 85:1, 50:1, 25:1, 10:1 and 5:1 are preferred. As a convention, the ratio is the ratio of the actual number of coordinating ligands in the polymer binder per one metal atom in the modified metal coordination complex (or the modified oligomeric metal coordination complex). In molar terms, for a known weight of polymer binder, the ligand number will vary significantly between binders such as polyacrylic acid, alginic acid, CMC, etc. The coordination potential of the ligand will also affect the ratio. As an example, the coordination strength of a carboxylic group ligand will be stronger than a hydroxyl group ligand. The ratios described above refer to carboxylic based ligands and when other ligands are used, the ratios can be adjusted according to the relative coordination strength of the ligands.

Similarly, one standard weight for different modified metal complexes (or modified oligomeric metal complexes) may vary with molecular weight of the starting material, the degree of oligomerisation, type of capping, method of synthesis (which may affect the reactivity of the capping groups), etc. While a similar ratio could be proposed between active material and the modified metal coordination complex, any such ratio may be affected by the presence of the polymer binder and so may be related to the polymer binder:modified metal coordination complex ratio when used in a mixture. Hence only the binder ratio is described.

In embodiments, the modified metal coordination complex may be defined as a reduced reactivity metal coordination complex, especially relative to the same metal coordination complex which is fully hydrated (for example a hexahydrate).

In embodiments, the modified metal coordination complex is modified such that its reactivity is reduced as compared with the same metal coordination complex which has not been so modified, for example the same metal coordination complex but in a fully hydrated state (for example in the form of a hexahydrate).

In embodiments, the reduced reactivity of the modified metal coordination complex may be defined as a reduced level of reactivity as compared with an unmodified metal coordination complex, for example an unmodified oxo-bridged chromium(III) complex. The unmodified metal coordination complex may be a fully hydrated metal complex. The oxo-bridged chromium(III) complex may be a fully hydrated oxo-bridged chromium(III) complex.

In embodiments, the unmodified oxo-bridged chromium (III) complex used for comparison purposes may be that as formed in 'Solution 1' of Example 1 in the examples section.

In embodiments, the modified metal coordination complex is modified such that its reactivity to, or speed to bond with, the at least one polymer is reduced as compared with the same metal coordination complex which has not been so modified.

In embodiments, the polymer used to assess the reduced reactivity by comparison to that with an unmodified metal coordination complex is polyacrylic acid (PAA).

In embodiments, the reduced reactivity of the modified metal coordination complex (or modified oligomeric metal coordination complex) may be defined as a reduced level of reactivity with PAA as compared with that of a corresponding unmodified metal coordination complex, especially a corresponding fully hydrated metal coordination complex.

In embodiments, the reduced reactivity of the modified metal coordination complex may be defined as a reduced level of reactivity with PAA as compared with that of an unmodified oxo-bridged chromium(III) complex. In embodiments, the unmodified oxo-bridged chromium(III) complex used for comparison purposes may be that as formed in 'Solution 1' of Example 1 in the examples section.

In embodiments of any of the aspects described herein, the at least one modified metal coordination complex is a capped metal coordination complex and/or a metal coordination complex formed at a low pH. In one embodiment, the at least one modified metal coordination complex is a capped metal coordination complex and may be formed at a lower pH to reduce its reactivity prior to its addition to active materials and polymer binders.

This is a distinct advantage of the present invention in that the at least one modified metal coordination complex is capable of reacting not only with one component of the liquid formulation, such as the polymeric binder, but rather it is capable of forming dative bonds with at least one of the polymeric binder(s) and at least one of the active material(s) present to thereby efficiently interconnect both of said components. Preferably, the at least one modified metal coordination complex will be able to form dative bonds to substantially all polymeric binders and active materials in the liquid formulation upon curing. The at least one modified metal coordination complex will also generally be reactive with metals used for current collection and so curing of the liquid formulation in the presence of such current collectors may also cause dative bonds to be formed, directly or indirectly, to enhance the binding between the active material, the at least one modified metal coordination complex and the current collector, thereby including it in the connected network. The desired substantially homogeneous interconnectivity may be achieved by the appropriate modification of the metal coordination complex to thereby avoid rapid and uncontrolled reactivity with only one of the components of the liquid formulation.

Dative bonds or coordinate bonds require the interaction of metal ions with ligands. Unmodified metal coordination complexes such as 'Solution 1' of Example 1 in the examples section exists with pre-existing ligands, including water molecules, and counter-ions such as perchlorate ions from the starting metal salt used. Depending on the metal ion and method of synthesis, they may include hydroxo- and/or oxo-bridges. All such complexes may be regarded to be dative bond complexes of metal ion with pre-existing ligands. In the presence of active materials and polymer binders there is exchange of these pre-existing ligands so that the metal complex forms tight association with these new ligands in the active materials and polymer binders. These new ligands commonly lead to multi-valent interactions that outcompete pre-existing ligands. These new ligand complexes may be described as dative bond complexes. Modified metal coordination complexes may be modified by "capping groups" that slows the exchange with ligands in the active material and polymeric binders. These capping group incorporated complexes may also be described as dative bond complexes. In each case, the association between the metal ions and the different "ligands" may lead to a different property being created as a consequence of its interaction. Here, this interaction may be via a dative bond.

In embodiments, the at least one modified metal coordination complex has been modified to display one or more capping groups coordinately bound to the metal of the at least one metal coordination complex. The capping groups will alter the reaction kinetics of the now modified metal coordination complex, particularly with moieties in the at least one polymeric binder, as they will be more resistant to being displaced than, for example, simple counterions or water ligands. The moieties of the at least one polymeric binder will therefore need to compete and eventually displace these pre-existing capping groups before it can coordinate with the at least one modified metal coordination complex. This slowing of the dative bond formation of metal ion on active material, on polymeric binder, between active materials, between polymeric binders, and between active material and polymeric binder allows for a more controlled and uniform integration of the components in the conductive binder material being formed. It will be appreciated that a much higher degree of uniformity, distribution and binding between active material and polymeric binder and, indeed, adjacent active or additional materials can be achieved when this reaction rate is controlled.

In one embodiment, the ligand (or capping group) of the modified metal coordination complex and the at least one polymeric binder both comprise a functional group with the same heteroatom (for example, oxygen, sulfur or nitrogen). In one embodiment, the ligand (or capping group) of the modified metal coordination complex and the at least one polymeric binder both comprise the same functional group, and the at least one polymeric binder comprises a greater number of said functional group than the ligand (or capping group). Said functional group may be, for example, a carboxylic acid (or carboxylate), an alcohol, a sulphate, a phosphate, or an amide. For example, in one embodiment, the functional group may be a carboxylic acid (or carboxylate). In this embodiment, the capping group may be, for example, an acetate or an oxalate, whereas the polymeric binder is a polymer comprising a carboxylic acid (or carboxylate), such as carboxymethylcellulose, an alginate or polyacrylic acid. In this embodiment, the capping groups would be expected to exchange with the binder, as once one carboxylic acid of the binder has exchanged with a capping group, the likelihood that a nearby carboxylic acid moiety on the binder would exchange for another capping group would be enhanced.

It will be clear to the skilled addressee that the proportions and relative reactivity of the different components of the liquid formulation in step (i) are of importance in controlling the formation of a homogeneous binder material of desired composition and physical and electrically conductive characteristics. Therefore, in embodiments, the method may include the step of controlling or adjusting the relative concentrations and/or reactivity of the at least one modified metal coordination complex and/or active material and/or polymeric binder.

It will also be appreciated that further control over the extent of binding on active material, on polymeric binder, between active materials, between polymeric binders, and/or between active material and polymeric binder can be influenced by control of the reaction pH, the temperature, approach to mixing and the relative concentrations of the components. Therefore, in embodiments, the method may further include the step of controlling the reaction pH and/or temperature prior to or during curing and/or mixing and/or relative concentrations of any of the components present.

Further, the degree of modification, for example the extent or excess of capping of the modified metal coordination complex (or modified oligomeric metal coordination complex), and the pH of the reaction can be controlled in tandem to modify the morphology of the binder material being formed, as will be discussed further below.

The use of active materials and polymer binders in forming electrodes was discussed in the applicant's earlier International publication nos. WO2016168892 and WO2017165916, which are hereby incorporated by reference in their entirety. In these documents active materials, such as silicon, were exposed to metal-ligand complexes and binders in the formation of electrode materials. In the approach described an active material would be placed in solution with an excess of reactive metal-ligand complex and the subsequently formed complex would then be washed to remove excess metal-ligand complex before being contacted with other active materials, such as carbon, and a polymer, such as PAA, in an electrode slurry. This approach provided a useful advance in the protection of silicon particles and improved performance of the electrode material over the prior art. An assumption was made that the electrode slurry thereby generated was substantially uniform in content but this turned out to be difficult to reproducibility control.

There was no realisation within these documents of the benefits of controlling the rate of binding between the metal-ligand complex, active material and binder. The metal-ligand complexes described therein are highly reactive and had to be added in excess to individually coat the active material. After removing the excess metal-ligand complex, binding of the metal-ligand coated active material with other active materials and polymer binders could occur. So, while the electrode materials formed provided useful conductivity and resistance to swelling, control over its uniformity was difficult. The unmodified reactivity of the metal-ligand complexes meant that a drop-in approach could not be implemented and this prior art biased the formation of the metal-ligand complex coated silicon particles. The approach described, in terms of first exposing the metal-ligand complex to an active material, was originally adopted because the intent was to disperse and protect the active material. While this is desirable, too much could also hinder conductivity. The electrode materials, thus formed, provided useful conductivity and resistance to swelling but it did not easily allow optimization of conductivity. The unmodified reactivity of the metal-ligand complex was so rapid that uniform reactivity between the various components within the mixture could not be easily achieved. Uniformity or homogeneity of the electrode material was worse if the metal-ligand complex was added to a solution of polymeric binder in the presence of the active material, in that there was no control. The unmodified metal complex interacted immediately giving no opportunity for uniform dispersion, and it greatly decreased binding to active materials as most of the available metal-ligand complex was depleted by the polymeric binder forming polymer particles cross-linked by metal complexes and not a conductive network comprising active materials in close association with each other and the polymer binder.

It will be appreciated, then, that although WO2017165916 discussed trying to form homogeneous mixtures of active materials, the slurries of the applicant's earlier publications were not as uniform in terms of forming an interconnected and substantially homogeneously conductive active material-polymeric binder network. The prior art could not be implemented as a drop-in solution of metal complex into a mixture containing active materials and polymer binder. There was no understanding of the further level of control required, through modification of the metal complexes, to achieve greater reproducibility, flexibility, iteration of variables to create alternative versions and manufacturing simplicity. It was only after significant experimentation that the inventors surprisingly found that the reactivity of metal coordination complexes could be modified such that they could not only be added to a solution of polymeric binder in the presence of the active material without uncontrolled cross-linking of the binder, but that the modification could provide for a controlled formation of workable slurries that on curing could form a stable, more uniform and reproducible conductive network.

Appropriate capping groups will therefore be those which slow down coordination of the modified metal coordination complexes with the at least one polymeric binder, but do not prevent it. Essentially, the displacement of the capping groups should occur over an appropriate commercial timeframe which can be easily tested by running parallel reactions of metal coordination complexes modified with different capping agents formed under various conditions and exposed to the same polymeric binder.

It will also be appreciated that references to the cured conductive binder material comprising dative bonds between the metal of the at least one modified metal coordination complex and both the at least one active material and the at least one polymeric binder refers to the overall situation within the binder material. That is, not every metal ion of the modified metal coordination complex will necessarily have a dative bond to both an active material and a polymeric binder. Modified metal coordination complexes can exist in oligomeric or multi-nuclear structures which affects the overall coordination potential of the complex. Every metal ion in the complex may not be able to bind with an active material and/or a polymer binder. Rather, when the modified metal coordination complex is considered as a whole in terms of its binding capacity and excess with respect to the other components throughout the binder material, the complex as a unit has the potential to form dative bonds to the active material and/or to the polymeric binder. Consequently, it may form further dative bonds between active materials, between polymer binders (inter- and intramolecular), and between active materials and polymer binders. The capping groups of the modified metal coordination complexes or the pH of the complexes may limit reactivity while mixing the components of the conductive binder material so that it can be uniformly distributed before significant interaction can occur. Especially in the situation of forming slurries, it is important that the slurries maintain a working viscosity in its preparation and coating to a current collector foil. Depending on the application, the delay curing may only require few minutes to possibly delays of 24 hrs or 48 hrs or 72 hrs or 1 week or more.

Considering that coordination is a reversible reaction, and that capping agents slow down the rate of coordination, curing involves a potential rearrangement of coordination interactions and/or completion of coordination after most or all the exchangeable capping groups have been replaced. After coating/casting, the forming conductive binder material undergoes a process of drying and calendering during which the final curing process takes place. The entire process involves a shift in the equilibrium towards more stable arrangements of a complex mixture. In embodiments, a majority of the total binding capacity of the added modified metal coordination complex will be taken up by dative bonds to the active material(s), dative bonds to the polymeric binder(s) and, optionally, to any current collector material to which the liquid formulation was exposed during curing. Consequently, the equilibrium process may lead to modified metal coordination complexes having further dative bonds to cross-link between active materials, between polymer binders (inter- and intramolecular), and between active materials and polymer binders. This will vary according to the selection of modified metal coordination complex, the active materials, polymer binders and their mixing and drying conditions. The references to the cured conductive binder material comprising dative bonds between the metal of the at least one modified metal coordination complex and both the at least one active material and the at least one polymeric binder does not only refer to a metal coordination complex in dative bond formation cross-linking one active material with one polymer binder but refers to the overall situation where a curing process leads to a cross-linked, physically robust, stable network comprising a population of modified metal coordination complexes interacting with active materials and polymeric binders in many different arrangements.

In embodiments, the method may further include the step of selecting or controlling the relative extent of the total coordination capacity of the metal coordination complex which is taken up by the capping groups. That is, there may be benefits in choosing or modifying the % of the total coordination capacity of the metal ions of the metal coordination complex (as measured by that remaining following formation of the metal coordination complex itself) taken up by capping groups. For example, the % of the total coordination capacity taken up by capping groups may be greater than 10%, or 20% or 30% or 40% or 50% any of which values may be combined to form a range with a maximum value of less than 100%, 95%, 90%, 80% or 70%. In embodiments, the capping group may be made available in excess of the available metal ion coordination sites to influence the reaction kinetics of subsequent bonding of the active material and polymeric binder. A value of 100%, or even in excess of 100%, may be desirable in embodiments wherein the reaction rate of the metal coordination complex with the binder material is to be reduced as much as possible.

In embodiments, the method may further include the step of controlling the relative strength of the capping group to be exchanged. That is, even one type of capping group can be manipulated to give different exchange rates. For example, an acetate anion can be simply added as a capping group at different excess, pH and temperature to affect its exchange rate such as described in Solution 4, Example 1. Acetate anions can also be far more stably incorporated into metal coordination complexes such as the case of chromium (III) acetate as described in Solution 6, Example 1. Chromium acetate, where the tri-chromium complex has 6 or more acetate groups, such as $[Cr_3O(O_2CCH_3)_7(OH)_2]$ or $[Cr_3O(O_2CCH_3)_6(OH_2)_3]^+)$, can be considered an oligomeric metal coordination complex with one of the most stable capping groups though it is just acetate anions and water molecules. A broad variation of exchange rates is possible by the selection of and the arrangement of the capping group within a metal coordination complex. In embodiments, there may be different capping groups on a metal coordination complex to give two or more different exchange rates.

In embodiments, useful capping groups may be those that include nitrogen, oxygen, or sulphur as dative bond forming groups. More preferably, the dative bond forming groups of the capping agent are oxygen or nitrogen. Even more preferably, the capping agent is one comprising a dative bond forming group which is an oxygen-containing group.

In embodiments, the oxygen-containing group of the capping group is selected from the group consisting of sulphates, phosphates, carboxylates, sulphonic acids and phosphonic acids.

In embodiments, the capping group may be selected from the group consisting of formate, acetate, propionate, oxalate, malonate, succinate, maleate, citrate, sulphate, phosphate, an amino acid, naphthalene acetate, and hydroxyacetate. In embodiments, the capping group may be selected from the group consisting of formate, acetate, propionate, oxalate, malonate, succinate, maleate, sulphate, phosphate, and hydroxyacetate.

In embodiments, the capping group is a monodentate, bidentate or multidentate capping agent. In embodiments, the capping group is a monodentate or bidentate capping agent.

In embodiments, the capping group may have a lower molecular mass and/or lower coordination strength for the metal coordination complex (especially oligomeric metal coordination complex) and/or lower electron density and/or fewer number of ligand binding sites than the at least one polymeric binder which will displace it.

In embodiments, each capping group has a molecular mass of less than 2000 Daltons, or less than 1000 Daltons, or less than 500 Daltons, or less than 400 Daltons, or less than 300 Daltons. Any of these values may be combined with a lower value of 10, 30 or 50 Daltons to form a range of molecular mass values for the capping agent such as 10 to 1000, 10 to 500, 10 to 400 or 10 to 300 Daltons. The choice of the size of the capping group is a related consideration to the actual coordination strength of that group based largely on the functional groups present. For example, strongly coordinating groups may only be required as part of a lower molecular weight entity whereas more weakly coordinating groups may, if a slower curing rate is desirable, be chosen as part of a larger molecular mass capping group to slow the rate at which they are competed off.

In embodiments, the capping group is not simply a counterion of the metal coordination complex, a water or water-derived ligand or a group donated by a base. For example, in forming metal coordination complexes it is common to expose the metal complex to a base, such as ethylene diamine, which simply encourages formation of the desired complexes. While the amine nitrogen may be, to a small degree, incorporated into the formed metal coordination complex it does not have a significant enough effect on the subsequent reactivity of the metal coordination complex to be considered a capping group. Therefore, in one embodiment, the capping group is not one donated by a base including ethylene diamine.

In embodiments, the capping group is a coordinating capping group. That is, the capping group forms at least one coordinate bond with the metal coordination complex.

It will be appreciated that either pre-capped metal coordination complexes, i.e. already modified metal coordination complexes, can be exposed to the active material and polymeric binder or the capping agent can be added with or prior to the metal coordination complex, for example a buffer solution of the metal coordination complex generated immediately before addition to the liquid formulation or buffer solution and metal coordination complex added to the liquid formulation at approximately the same time. This may be appropriate so long as the capping group is much more immediately reactive to the metal coordination complex than either the active material or the polymeric binder and so the metal coordination complex becomes modified prior to forming dative bonds, to any significant extent, with the active material or polymeric binder which will each, over the appropriate time frame compete off the capping groups.

In embodiments, the active material may be in the liquid formulation with the at least one polymeric binder prior to exposure to the modified metal coordination complex and so step (i) may comprise; step (ia) providing a liquid formulation comprising a liquid carrier, at least one active material, and at least one polymeric binder; and step (ib) contacting the liquid formulation of step (ia) with at least one modified metal coordination complex.

In such an embodiment, it will be appreciated that the at least one active material and at least one polymeric binder may be added to the liquid carrier in any order. In one embodiment, both the active material and the polymeric binder are both present in the liquid carrier when the modified metal coordination complex is added thereto.

In embodiments, the at least one active material, at least one polymeric binder and the at least one modified metal coordination complex may be added to the liquid carrier in any order so long as all are present in the liquid carrier to allow the modified metal coordination complex to coordinate to both the at least one active material and at least one polymeric binder. While the at least one modified metal coordination complex may typically be added last simply as a matter of convenience as the curing of the formulation can start at this point, the order of addition is not otherwise important so long as sufficient time prior to final curing remains to coat the current collector and complete final stamping and curing of the electrode.

In embodiments where aqueous solvents are employed, the modified metal coordination complex has been modified by formation at a pH below 3.8. The inventors have surprisingly found that there is a useful relationship between the size of the formed metal coordination complex (such as an oligomeric metal coordination complex), the type of capping group and the excess used, and pH of the metal coordination complex solution that results in complexes that demonstrate a modified reactivity to the subsequently introduced polymeric binder. While not wishing to be bound by theory, at any pH, the competition for coordination to metal coordination complexes between the various components that form the binder material changes. At higher pH values, such as above pH 3.8, the strength of binding of metal coordination complexes to silicon and/or carbon nanoparticles gets progressively stronger, and its ability to strongly react with any other ligand, such as a polymer, also becomes stronger. Higher pH conditions of the metal coordination complexes, as described in the prior art, enhances the coating of nanoparticles by any available polymer in a rapid uncontrolled manner. At lower pH values, such as below pH 3.8, the reactivity of the formed metal coordination complex decreases and whether augmented by capping groups of certain binding strength and concentration, or whether buffered by the capping group to help stabilise a certain target pH, allows fine control that allows the formation of a binder material, as described.

In embodiments, the modified metal coordination complex has been modified by formation at a pH below 3.7, or below 3.6, or below 3.5 or below 3.4 or below 3.3 or below 3.2 or below 3.1 or below 3.0. The pH at formation will, in all instances of the above cited upper limits, be greater than 1.0 or 1.5.

This pH may be the final pH when the metal coordination complex is considered to have formed. This is because many metal salts, such as chromium salts, are highly acidic and release hydrogen ions as the complexes form. The pH of such a solution can therefore become more acidic over time as the complexes form and it is the final pH which is key to the nature of the metal coordination complex formed, and so, its degree of modification.

Therefore, in embodiments, the method may further comprise the step of forming a modified metal coordination complex. The forming may be a modification of an existing metal coordination complex or it may be concurrent formation of the metal coordination complex and modification of same as it forms.

The step of forming the modified metal coordination complex may include contacting the metal coordination complex with a solution comprising a capping group, such as an acetate buffer solution. Alternatively, the step of forming the modified metal coordination complex may include stabilising the corresponding monomeric metal coordination complex to a pH below 3.8, or below 3.7, or below 3.6, or below 3.5 or below 3.4 or below 3.3 or below 3.2 or below 3.1 or below 3.0 to thereby form the modified metal coordination complex or, as discussed below, a modified oligomeric metal coordination complex.

In embodiments, the modified metal coordination complex can be formed via the direct reduction of chromium (VI) oxide in the presence of suitable capping groups such as acetic acid. Once the complex is synthesized, the pH can be adjusted as required.

The method may further include the step of adjusting the pH of the liquid formulation, comprising the modified metal coordination complex, to be between pH 3.8 and pH 1.5 and/or controlling the temperature of the liquid formulation to be between 10 to 25° C. prior to curing.

In embodiments, the step of adjusting the pH may include adjusting the pH of the solution in which the metal coordination complexes are forming to ensure the desired degree of modification. This may comprise allowing the pH to become more acidic due to the release of hydrogen ions by the metal salts employed or it may comprise the addition of a base, such as ethylene diamine or a metal hydroxide, to mop up some of the released hydrogen ions to prevent the solution becoming too acidic. If a base is added then the amount will be such that the solution is still acidic, as defined above.

In embodiments, the modified metal coordination complex modified to some pre-defined pH will change due to the pH of the at least one active material and at least one polymeric binder within the liquid carrier. In some embodiments the final formulation pH prior to casting may be between pH 4 to around neutral, wherein neutral may be represented by a pH such as 6-8 (or 6-7). The pH can be adjusted by the pH of the at least one active material and at least one polymeric binder within the liquid carrier before addition of the modified metal coordination complex or alternatively, the final pH can be adjusted prior to casting.

The method may further include the step of agitating the liquid formulation prior to curing.

The agitating may be shaking, mechanical mixing, rotating, stirring, centrifuging and the like.

In embodiments, the method may further include the step of adding one or more additives to the liquid formulation. Introduction of such additives may be prior to or following addition of the modified metal coordination complex. Appropriate additives may be those known in the art for use in forming electrodes.

In embodiments, the at least one active material and at least one polymeric binder in the formulation are interconnected by the modified metal coordination complex. It will be appreciated that formation of dative bonds to active material and polymeric binder may mean the modified metal coordination complex may no longer be considered ‘modified’ or may be reduced in the extent of its modification relative to that prior to dative bond formation. For example, when the modification is with capping groups it will be understood that dative bond formation with the active material and polymeric binder will necessarily remove certain, a majority or substantially all of the number of capping groups bound to the metal coordination complex and so the level of modification may be viewed as having been reduced or the metal coordination complex may now be described as not modified or only partially modified.

By “interconnected”, as used herein, it is intended that, while each individual modified, partially modified or unmodified metal coordination complex may not be coordinately bound to both an active material and a polymeric binder, across the entire formulation, a majority of active materials and polymeric binders in the formulation will be connected, directly or indirectly, through one or more modified or unmodified metal coordination complexes.

Similarly, “a cured conductive binder material comprising dative bonds between the metal of the at least one modified metal coordination complex and both the at least one active material and the at least one polymeric binder” may be understood to include within its scope such a material wherein the at least one active material and/or the at least one polymeric binder are indirectly bound to the metal of the at least one modified metal coordination complex by a dative bond. That is, individual moieties of the at least one active material and/or the at least one polymeric binder may be bound to other such at least one active materials and/or at least one polymeric binders and one or more of these are datively bonded to the metal. For example, some or all of the active material moieties may be bonded to the polymeric binder and it may be the polymeric binder which directly interacts, via dative bonds, with the metal of the metal coordination complex. Preferably, both the at least one active material and the at least one polymeric binder interact directly, to at least some extent, with the metal of the metal coordination complex but it will be appreciated they may do so to different degrees. However, the presence of the metal complex in the cured composition may allow for charge-charge, hydrogen-bonding or even hydrophobic bonding within the formulation.

In embodiments, the curing of the liquid formulation may occur at an elevated temperature, being a temperature above room temperature. Suitably, the initial curing may be at a temperature greater than 25° C., preferably at between 25 to 100° C. which serves to remove a portion of the liquid and encourage curing. In one embodiment, the step of curing the liquid formulation may comprise at least partially removing free liquid carrier. The term “free liquid carrier” refers to liquid carrier that is unbound to a component of the liquid formulation, such as the metal coordination complex, the polymeric binder, or the active material.

The curing may not necessarily be to complete dryness as coordinated or occluded water molecules may still be presented and the modified metal coordination complex may still be rearranging at these elevated temperatures. As a final drying and curing step, further heating between 100° C. to 250° C., preferably in a vacuum oven, may be required.

In embodiments, the curing may take place over a timeframe normally used to dry conventional electrodes. Exemplary time ranges covering different roll-to-roll coating line set-ups may include: 1 s to 10 min or 10 min to 1 h, or 1 h to 24 h.

In one embodiment, the curing takes place for a predetermined time. In one embodiment, the predetermined time is at least 30 minutes, at least 1 hour, at least 2 hours, at least 4 hours, at least 6 hours, at least 8 hours, at least 10 hours, at least 12 hours, at least 14 hours, at least 16 hours, at least 18 hours, at least 20 hours, at least 22 hours, or at least 24 hours. Advantageously, curing the formulation over such timeframes allows for greater consistency, homogeneity and quality control over binder material formed by the method. Furthermore, curing the formulation over such timeframes allows more time for the formulation to be worked and positioned in an appropriate location/configuration before curing is complete.

The point at which the curing step takes place may depend upon the end use of the conductive binder material and so there may be one or more steps prior to step (ii). For example, when the conductive binder material is to be or be part of an electrode, then there may be a step of casting the liquid formulation onto a current collector, prior to curing. During this process, further exchange and rearrangements of metal complexes may occur and/or dative bonds may be formed between the surface of the current collector and the metal of the modified, partially modified or now unmodified metal coordination complex.

It will be appreciated that the modified metal coordination complex can be thought of as a simple ‘drop-in’ solution. It may be added to the liquid formulation such that it is simultaneously exposed to both the at least one active material and at least one polymeric binder. Alternatively, and depending on the particular modification of the reactivity to the at least one active material and at least one polymeric binder, it may be added initially in the presence of one or the other of those components and the remaining one added subsequently.

In one embodiment, the method of the first aspect of the present invention is performed at a temperature of below 400° C., preferably below 200° C., or below 180° C., or below 160° C. In one embodiment, the method of the first aspect is performed at a temperature of below 150° C., or below 140° C., or below 130° C., or below 120° C., or below 110° C. or below 100° C. In one embodiment, the method of the first aspect of the present invention is performed at a temperature of at least 0° C., especially at least 5° C., or at least 10° C., or at least 15° C. or at least 20° C. In one embodiment, the method of the first aspect is performed at room temperature or greater. In one embodiment, the method of the first aspect is performed at a temperature of from 0° C. to 200° C., especially from 5° C. to 180° C., or from 10° C. to 160° C. It is believed that performing the method at these temperatures advantageously allows the formation of dative bonds between the metal ion of the modified metal coordination complex and other components of the formulation, such as the active material and the at least one polymeric binder. It is believed that at higher temperatures oxides and other complexes of the metal ion may form.

In one embodiment, the method of the first aspect of the present invention is performed at a pressure of from 0.5 atm to 5 atm, or from 0.5 atm to 3 atm, or from 0.5 atm to 2 atm, or about 1 atm.

In a second aspect, there is provided a curable binder formulation comprising:

(i) a liquid carrier;
(ii) at least one active material;
(iii) at least one polymeric binder; and
(iv) at least one modified metal coordination complex.

In one embodiment of the second aspect, the curable binder formulation is substantially homogeneous throughout its extent and is curable to form dative bonds between the metal of the at least one modified metal coordination complex and both the at least one active material and the at least one polymeric binder.

The liquid carrier, at least one active material, at least one polymeric binder and at least one modified metal coordination complex may be as previously described for the first aspect. The manner in which these components are contacted with one another and any additional components may also be as described for the first aspect.

The curable binder formulation of the second aspect may be uniform or homogeneous with respect to the dispersal of the at least one active material within the polymeric binder network. The term homogeneous is generally intended to describe well dispersed and well distributed active material (though not current collector active material), polymeric binder and modified metal coordination complex within the formulation.

It will be appreciated that the curable binder formulation will be a dynamic environment, particularly initially when the modified metal coordination complex first comes into contact with the at least one active material and at least one polymeric binder. Particularly, the modified metal coordination complex may react with the at least one active material and at least one polymeric binder and form dative bonds with both to form an interconnected network. This may happen to some extent even prior to curing, as described for the first aspect, and even more so after curing. It will be appreciated by the skilled addressee that, at this point and depending on the nature of the modification to the modified metal coordination complex, the modified metal coordination complex may change in nature due to the network of dative bonds being formed. For example, if the metal coordination complex was initially modified by the use of capping groups coordinately bound to the complex then a number, a majority, or even substantially all of these may be removed due to binding of the at least one active material and at least one polymeric binder. In this sense, the metal coordination complex may be viewed as no longer being 'modified', at least in comparison to the complex prior to contact with the at least one active material and at least one polymeric binder. It will be appreciated that since some extent of modification, for example capping groups, may remain bound that reference herein to "unmodified" includes a reduction in the extent of the modification as compared with the modified metal coordination complex added to the formulation prior to contact with the at least one active material and at least one polymeric binder.

In one embodiment, therefore, the metal coordination complex is a modified metal coordination complex prior to its having reacted, to a significant extent, with the at least one active material and/or at least one polymeric binder.

In one embodiment, the metal coordination complex is an unmodified metal coordination complex, which includes a partially modified metal coordination complex, following its having reacted, to at least some significant extent, with the at least one active material and/or at least one polymeric binder.

In embodiments, the above-described slurry formulation has a Brookfield® viscosity in a range of from about 1,500 to about 15,000 mPa·s, or from about 3,000 to about 10,000 mPa·s, or from about 4,000 to about 9,000 mPa·s, as measured at 30 RPMs with spindle #4 at ambient conditions. In embodiments, the viscosity of the conductive composite formulation before and immediately after addition of the metal coordination complex does not appreciably change to advantageously assist with coating of the conductive composite formulation to the current collector.

In a third aspect, the invention resides in a method of forming the curable binder formulation of the second aspect including the steps of:

(i) providing a liquid carrier;
(ii) adding to the liquid carrier; at least one active material, at least one polymeric binder and at least one modified metal coordination complex; and
(iii) mixing the liquid carrier; at least one active material, at least one polymeric binder and at least one modified metal coordination complex, to thereby form the curable binder formulation of the second aspect.

In one embodiment of the third aspect, the curable binder formulation being substantially homogeneous throughout its extent and curable to form dative bonds between the metal of the at least one modified metal coordination complex and both the at least one active material and the at least one polymeric binder.

The liquid carrier, at least one active material, at least one polymeric binder and at least one modified metal coordination complex may be as previously described for the first and/or second aspects. The manner in which these components are contacted with one another and any additional components may also be as described for the first and second aspects. Particularly, the at least one modified metal coordination complex may, as described for the first aspect, be added subsequently to the at least one active material and at least one polymeric binder being located together within the liquid carrier.

The addition of one or more of the at least one active material, at least one polymeric binder and at least one modified metal coordination complex may be with mixing as previously defined.

In a fourth aspect, the invention resides in a cured conductive binder material comprising at least one active material, at least one polymeric binder, and at least one metal coordination complex, the at least one active material and at least one polymeric binder being interconnected by the at least one metal coordination complex, and wherein the conductive binder material comprises dative bonds between the metal of the at least one metal coordination complex and both the at least one active material and the at least one polymeric binder and is substantially homogeneous throughout its extent.

The at least one active material, at least one polymeric binder, and metal coordination complex may be as described in any of the first to third aspects.

The comments made above in relation to the first and second aspects apply to the fourth aspect in terms of the modified metal coordination complex having reacted to form dative bonds with the at least one active material and at least one polymeric binder and so no longer being modified, as previously defined. Particularly, it will be appreciated that, once the composite material is formed, it may no longer be appropriate to refer to the metal coordination complex as 'modified' and so the metal coordination complex is not referred to in this way for the fourth aspect. That is, the formed dative bonds with the at least one active material, at least one polymeric binder and, optionally, a current collector with the modified metal coordination complex may, at least partially, remove the modified nature of the metal coordination complex. This is particularly so if the modification is the presence of capping groups on the metal coordination complex as coordination of the polymeric binder will, as previously discussed, cause the capping groups to be dissociated from the metal coordination complex. It will therefore be understood that the use of the term "metal coordination complex" in relation to the fourth aspect is reference to a complex resulting from the modified metal coordination complex (or modified oligomeric metal coordination complex) of the first, second and third aspects but, at least, having a reduced or diminished level of modification when compared with the modified metal coordination complex (or modified oligomeric metal coordination complex) prior to exposure to the at least one polymeric binder and at least one active material.

In embodiments, references to "cured" may be considered reference to the cured material having been exposed to an elevated heat treatment as described for the first aspect.

The cured conductive binder material of the fourth aspect may be substantially uniform or substantially homogeneous with respect to the dispersal of the activated material within the polymeric binder network. The term substantially homogeneous is generally intended to describe well dispersed and well distributed active material, polymeric binder and metal coordination complex (modified or unmodified or both in part) within the cured conductive binder material.

In embodiments of any of the first to ninth aspects herein, "homogeneous" or "substantially homogeneous" may be considered to be a degree of uniformity wherein the majority of active material particles are linked to the polymeric binder network by one or more of the metal coordination complexes. Therefore, in embodiments, the term may be applied only to an active material which is in a particulate or dispersed form and not one which is in a larger unitary form, such as a current collector material.

As used herein in relation to any of the first to ninth aspects, the term "majority" refers to at least 50%, 60%, 70%, 80%, 90% or 95% of the relevant environment or situation being the case, such as the active material particles being linked through at least one dative bond to an at least one polymeric binder to any of these extents.

In embodiments, the cured conductive binder material, is or forms a component of an article selected from a charge collector substrate, an electrode, and a separator material for a battery application.

In preferred embodiments, the cured conductive binder material is or is part of an electrode material.

The electrode material may be appropriate to form either an anode or a cathode. In one embodiment, the electrode material is appropriate to form an anode.

As described previously, when silicon and/or carbon particles (especially nanoparticles) are formed into an electrode material and coated onto a charge collector electrode substrate to form an electrode, despite the strain imposed on the system as a result of cyclic intercalation of electrolyte, such as lithium, the metal coordination complex acts to mitigate the stresses and strains associated with the expansion and contraction of the active material particles (especially nanoparticles). In the present instance, this is particularly so because the particles (especially nanoparticles) are all physically bound to the polymeric binder network and so the entire network expands and contracts together with the metal coordination complex breaking and then reforming dative bonds to self-heal. This is also the case for bonding to the current collector. This approach assists in minimising or preventing deterioration and breakup of the contact between the materials. The interconnected network may also provide for a better conductive electrode material. This unexpected effect can provide for a long cycle life for such formed electrode materials and provide for higher energy densities and/or faster charge and/or discharge cycles.

It will be appreciated that the cured conductive binder material described herein, when incorporated within an electrode, may provide certain one or more advantages in operation such as serving to: (i) improve physical adhesion or binding of the active material to the polymeric binder and to the underlying current collector; (ii) improve or increase ionic and electrical conductivity; (iii) improve or maintain the stability of the active material; (iv) decrease the solubility of certain electrode materials; (v) increase the cycle life of batteries; (vi) improve the power performance (rate performance) of the active material particle; and (vi) reduce overall battery waste.

In a fifth aspect, the invention resides in a curable binder formulation produced according to the method of the third aspect.

In a sixth aspect, the invention resides in a cured conductive binder material formed by curing the curable binder formulation of the second aspect or by curing the curable binder formulation prepared according to the method of the third aspect.

In a seventh aspect, the invention resides in a cured conductive binder material produced according to the method of the first aspect.

For the fifth to seventh aspects, the at least one active material, at least one polymeric binder, and at least one modified metal coordination complex (partially modified or otherwise) may be as described in any of the first to fourth aspects.

In an eighth aspect, the invention resides in a method of fabricating an electrode including the step of fabricating the electrode from the cured conductive binder material formed by the first aspect; or from the curable binder formulation of the second aspect; or from the curable binder formulation produced according to the method of the third aspect; or from the cured conductive binder material of the fourth aspect.

In an embodiment, the step of fabricating the electrode includes casting the electrode from a curable binder formulation as described in any one or more embodiments of the above aspects. The casting may be onto an appropriate current collector.

In embodiments, the step of fabricating the electrode includes casting the liquid formulation of the first aspect onto an appropriate current collector prior to the step (ii) of the first aspect of curing said formulation onto said current collector.

The casting may be performed by methods well-known in the art. It is an advantage of the present approach that such standard methods are suitable as the addition of the modified metal coordination complexes does not significantly affect the viscosity of the slurry (liquid formulation) such that special manufacturing processes would be required.

In embodiments, the casting may be a coating of the current collector which may be achieved by spraying, dipping and other known means of contacting the current collector with the formulation. The casting may include a timing aspect whereby the coating is performed before the formulation cures to such a degree that the viscosity renders it difficult to manipulate with standard equipment.

In embodiments, the coated current collector may be exposed for a period of time to a temperature of at least 40° C., preferably between 50 to 60° C. to remove a substantial portion of the solvent present, such as water. This step further assists with curing of the forming electrode matrix.

The coating may then be calendared and stamped into the desired electrode shape. Calendaring includes rolling and compacting the partially dried slurry and so the preceding initial heating step to remove excess, but not all, moisture is necessary. In embodiments, the formed electrode is then exposed to further heating in a vacuum oven to remove any remaining moisture and continue the curing process if still uncompleted. Appropriate temperatures will depend on the vacuum applied but temperatures above 80° C. and preferably between 100 to 150° C. are typical.

In a ninth aspect, there is provided an electrochemical cell including: an anode, a cathode, and an electrolyte arranged between the anode and the cathode; wherein at least one of the anode or the cathode comprises a cured conductive binder material which is formed by; the method of the first aspect; or by curing the curable binder formulation of the second aspect; or by curing the curable binder formulation prepared according to the method of the third aspect; or which is the cured conductive binder material of the fourth aspect; or which is formed by the sixth or seventh aspects or wherein at least one of the anode or the cathode is an electrode formed by the method of the eighth aspect.

As a result of incorporation of said binder material, the electrode may exhibit improved performance as compared with an electrode which does not comprise said composite material. In certain embodiments, the improved performance is at least one selected from the group consisting of: higher 1st cycle discharge capacity, higher 1st cycle efficiency, higher capacity after 50 to 1000 deep charge/discharge cycles at 100% depth of charge. Preferably, the improved performance is higher capacity after 1000 deep charge/discharge cycles.

In one embodiment the capacity in a full cell after 50 to 1000 deep charge/discharge cycles at 100% percentage depth of discharge of an electrode containing the cured conductive binder material of the present invention is at least 5% greater, or at least 10% greater, or at least 20% greater, or at least 30% greater, or at least 40%, or at least 50% greater, or at least 70% greater than an electrode of the same general composition not comprising the cured conductive binder material.

Preferably, the improved performance is higher capacity after 200 deep charge/discharge cycles in a full cell; even more preferably, the improved performance is higher capacity after 500 deep charge/discharge cycles in a full cell; most preferably the improved performance is higher capacity after 1000 deep charge/discharge cycles in a full cell.

In one embodiment the capacity $1^{st}$ cycle efficiency at 100% percentage depth of discharge of an electrode containing the cured conductive binder material of the present invention is at least 1% greater, or at least 3% greater, or at least 10% greater, or at least 20% greater than an electrode of the same general composition not comprising the cured conductive binder material. Preferably, the improved $1^{st}$ cycle efficiency is at least greater than 70%, or at least greater than 80% or at least greater than 85%; more preferably the $1^{st}$ cycle efficiency is in between 85%-90%; most preferably the first cycle efficiency is in between 90%-94%.

In one embodiment the first cycle specific discharge capacity in mAh/g at 100% percentage depth of discharge of an electrode containing the cured conductive binder material of the present invention is at least 1.1× (400 mAh/g), or at least 1.3× (450 mAh/g), or at least 1.4× (500 mAh/g), or at least 1.7× (600 mAh/g), or at least 2.0× (700 mAh/g), or at least 2.6× (900 mAh/g), or at least 3.4× (1200 mAh/g), or at least 4.3× (1500 mAh/g), or at least 5.1× (1800 mAh/g), or at least 5.7× (2000 mAh/g) greater, or at least 7.1× (2500 mAh/g), or at least 8.6× (3000 mAh/g) than a state-of-the-art graphite only containing anode of 350 mAh/g. Preferably, the first cycle specific discharge capacity in mAh/g is at least greater than 500 mAhg, or least greater than 600 mAh/g; or least greater than 800 mAh/g, or least greater than 1000 mAh/g, or least greater than 1500 mAh/g; or least greater than 2000 mAh/g, or least greater than 2500 mAh/g, or least greater than 2950 mAh/g more preferably the first cycle specific discharge capacity in mAh/g is in between 1000 and 2500 mAh/g (or between 700 and 800 mAh/g); most preferably the first cycle specific discharge capacity is in between 1000 and 1500 mAh/g (or between 1000 and 1400 mAh/g).

The following comments regarding the metal coordination complex, associated ligands and binding thereof, apply to all first to ninth aspects of the invention.

In embodiments, the metal ion of the metal coordination complex is selected from the group consisting of chromium, ruthenium, titanium, iron, cobalt, aluminium, zirconium and rhodium. In embodiments, the metal ion of the metal coordination complex is selected from the group consisting of chromium, ruthenium, titanium, iron, cobalt, aluminium, zirconium and combinations thereof. In embodiments, the metal ion of the metal coordination complex is selected from the group consisting of chromium, ruthenium, titanium, iron, cobalt, aluminium, zirconium, rhodium and combinations thereof.

Preferably, the metal ion is chromium.

The metal ion of the metal coordination complex (especially the oligomeric metal coordination complex) may be present in any applicable oxidation state. For example, the metal ion may have an oxidation state selected from the group consisting of I, II, III, IV, V, or VI, as appropriate and obtainable under standard conditions for each individual metal. The person of skill in the art would be aware of which oxidation states are appropriate for each available metal.

In an embodiment in which the metal ion is a chromium ion, it is preferred that the chromium has an oxidation state of III.

The metal ion may be associated with any suitable counter-ions such as are well-known in metal-ligand coordination chemistry.

In certain embodiments, mixtures of different metal ions may be used, for example, to form a plurality of different metal coordination complexes. In such cases, it is preferred that at least one metal ion is chromium.

Metals are known to form a range of metal coordination complexes. Preferred ligands for forming the metal coordination complex are those that include nitrogen, oxygen, or sulfur as dative bond forming groups. More preferably, the dative bond forming groups are oxygen or nitrogen. Even more preferably, the dative bond forming group is an oxygen-containing group which assists in olation to form the oligomeric complexes. In embodiments, the oxygen-containing group is selected from the group consisting of oxides, hydroxides, water, sulphates, phosphates, or carboxylates.

The metal coordination complex can also be further stabilised by cross-linking the metal ions of individual complexes with each other to form larger oligomeric metal coordination complexes. Thus, in one embodiment the metal coordination complex is an oligomeric metal coordination complex and so all references herein to "metal coordination complex", modified, partially modified or unmodified, may be replaced with "oligomeric metal coordination complex", also in relation to modified, partially modified or unmodified such complexes. Preferably, the oligomeric metal coordination complex is a chromium (III) oligomeric metal coordination complex, which may be modified as previously described.

In one embodiment, the metal coordination complex comprises, as a ligand, a bridging compound that is datively bonded to at least two metal ions. Preferably, this results in the formation of the oligomeric metal coordination complex.

In certain embodiments, mixtures of different ligands may be used to form the metal coordination complex or complexes. The different ligands may have different functions, for example, to form a plurality of different metal coordination complexes, to bridge between metal coordination complexes, to cross-link metal ions, or to provide a surface for forming a dative bond with various components of the composite (especially with active materials and polymer binders).

In one exemplary embodiment, the metal coordination complex is an oxo-bridged chromium(III) complex. In embodiments, the oligomeric metal-coordination complex is a chromium (III) oligomeric metal-coordination complex. In embodiments, the oligomeric metal coordination complex is an oxo-bridged chromium (III) oligomeric coordination complex. These complexes may optionally be further oligomerised with one or more bridging couplings such as carboxylic acids, sulphates, phosphates and other multidentate ligands.

The metal coordination complex will be discussed below, in terms of available variations in the synthetic approach and the potential for differences thereby achieved in the final product.

The metal coordination complexes can be formed by providing conditions for forming electron donating groups for bridging or otherwise linking or bonding two or more metal ions. This can be done by providing a pH below pH 7 such as below pH 6 or below pH 5, preferably between about 1.5 to 7, or about 2 to 7, or about 3 to 7 or about 4 to 7, or about 1.5 to 6, or about 2 to 6, or about 3 to 6 or about 4 to 6 to the solution when forming the complexes. Clearly, the chosen pH will depend on the approach by which modification of the metal coordination complex is to be achieved. That is, while pHs above 3.8 are appropriate for forming the metal coordination complex when they are to be modified by use of capping groups, a pH below 3.8 may assist if the modification is during formation of the metal coordination complex (or oligomeric metal coordination complex) based on a pH adjustment approach alone.

Various chromium salts such as chromium chloride, chromium nitrate, chromium sulphate, chromium acetate, and chromium perchlorates, may be used to form the metal coordination complex. Unless pre-existing in some oligomeric form (when oligomeric complexes are desired) and used 'as is', these salts are mixed with an alkaline solution, such as potassium hydroxide, lithium hydroxide, sodium bicarbonate, sodium sulphite and ammonium hydroxide to form different metal coordination complexes. Organic reagents that can act as bases such as ethylene diamine, bis(3-aminopropyl)diethylamine, pyridine, imidazoles, can also be used. The size and structure of the metal coordination complex can vary with pH, temperature, solvents and other conditions.

Exemplary oxo-bridged chromium structures are provided below, albeit without indication of any appropriate modification of reactivity towards the at least one active material and at least one polymeric binder:

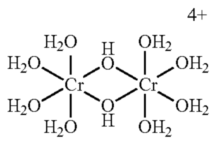

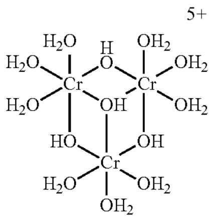

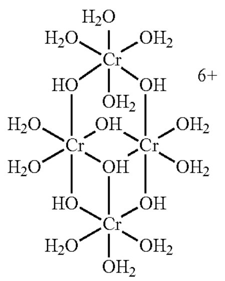

On application to the liquid formulation in the presence of the at least active material and at least one polymeric binder, at least one of the water or hydroxyl groups (or whatever ligands may be present) on each of the metal coordination complexes is replaced by a dative bond with one or more of these components. This is illustrated below wherein "X" represents the dative bond to, for example, the surface of the active material or a suitable moiety of the polymeric binder.

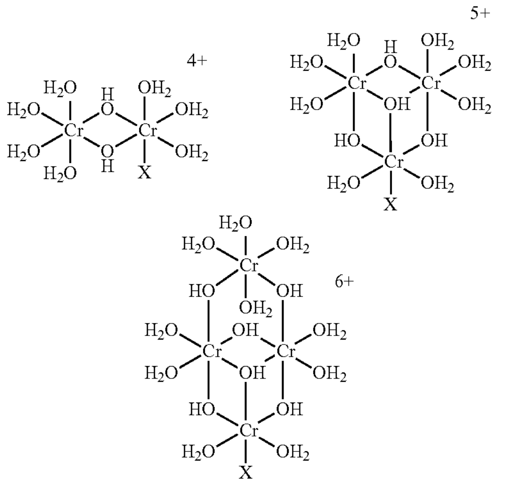

It will also be appreciated that multiple water or hydroxyl groups, or other ligands present on the oligomeric metal coordination complex, may be replaced by a dative bond with the surface of the least one active material(s) or the polymeric binder, for example at least one chromium ion within the oligomeric metal coordination complex may form a dative bond with the surface of the active material and/or with a polymeric binder.

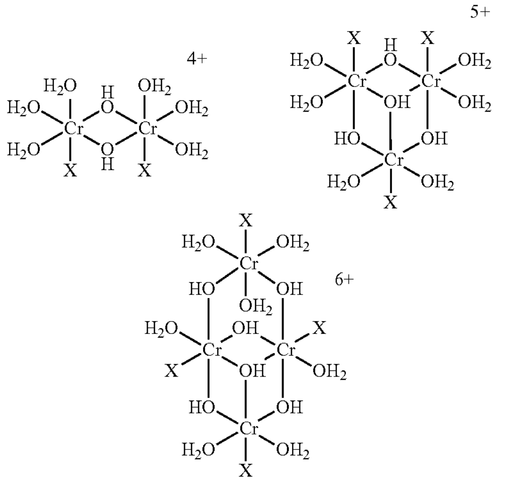

In addition, the water and/or hydroxyl groups may be replaced by a dative bond with an additional component of the formulation, such as a further active material or binder.

In one embodiment, the metal forming the metal coordination complex (or oligomeric metal coordination complex) is not the same as that forming the active material particle (especially nanoparticle). For example, if a chromium metal coordination complex is employed then the active material particle (especially nanoparticle) is not chromium metal.

In preferred embodiments, the metal coordination complex is not incorporated with the active material particles (especially nanoparticle) by a melt process. That is, the metal of the metal coordination complex is not melted together with the active material nanoparticles as this would not result in formation of the required composite materials.

It will be understood that the invention disclosed and defined in this specification extends to all alternative combinations of two or more of the individual features mentioned or evident from the text or drawings. These different combinations constitute various alternative aspects of the invention.

EXAMPLES

Example 1: Preparation of Metal Coordination Complex Solutions

Examples of metal-coordination complexes are described. Depending on the metal ion, salt, the base, the final pH, other ligands used, and method of its synthesis, the metal complex solutions exhibit different binding rates.

Unmodified Metal Coordination Complex

Solution 1

In this example, chromium perchlorate hexahydrate (45.9 g) was dissolved into 480 mL of purified water and mixed thoroughly until all solid dissolved. Similarly, 8 mL of ethylene diamine (EDA) solution was added to 490 mL of purified water. The solutions were combined by the dropwise addition of the EDA solution into the chromium salt solution and stirred overnight at room temperature, and then left to equilibrate to a pH of approximately 4.5. This metal coordination complex rapidly binds to different materials.

Modified Metal Coordination Complexes

Solution 2

Similarly, different ratios of chromium perchlorate and ethylenediamine solution can be used to generate solutions having a different pH such as pH 3.0, 4.0, pH 5.0 or some other pH. As an example, chromium perchlorate hexahydrate (103.5 g) was dissolved into 1000 mL of purified water and mixed thoroughly until all solid dissolved. 8 mL of ethylene diamine solution was added to 1000 mL of purified water. The solutions were combined by the dropwise addition of the EDA solution into the chromium salt solution, and stirred overnight at room temperature, and then left to equilibrate to a pH of approximately 3.0. Lower pH reduces reactivity of the metal coordination complex.

Solution 3

In this example, chromium sulphate hexahydrate (39.2 gm) was dissolved into 460 mL of purified water and mixed thoroughly until all solid dissolved. 3.6 g of lithium hydroxide was added to 500 mL of purified water and mixed thoroughly until all solid dissolved. The solutions were combined by the dropwise addition of LiOH solution into the chromium salt solution, and stirred overnight at room temperature, and then left to equilibrate to a pH of approximately 3.0.

Solution 4

In this example, 500 ml 100 mM acetate buffer at pH 3.6 is added dropwise to 500 ml of Solution 2 with stirring, and then left to equilibrate to a pH of approximately 3. Similarly, different excesses of acetate at the nominate pH can be added to the different versions of Solution 1, 2 and 3.

Solution 5

In this example, 500 ml 100 mM oxalic buffer at pH 3.5 is added dropwise to 500 ml of Solution 3 with stirring, and then left to equilibrate to a pH of approximately 3.5. Similarly, different excesses of oxalate at the nominate pH can be added to the different versions of Solution 1, 2 and 3.

Solution 6

In this example, 90.5 g chromium acetate (where the tri-chromium complex has 6 or more acetate groups, such as $[Cr_3O(O_2CCH_3)_7(OH)_2]$) was dissolved into 3000 mL of purified water and mixed thoroughly until all solid dissolved. The pH of the 50 mM solution was pH 4.2 and can be pH adjusted as required. This example could be considered a fully capped version of Solution 4 giving slow reactivity of the metal complex to binding active materials and polymer binders. However, the reactivity of such metal complexes can be further decreased by the addition of other capping groups such as acetates, oxalates, etc.

Solution 7

Hydrophobic capping groups can be also used. In this example, 9.3 g, 50 mmoles) of 1-napthalene acetic acid solution in 100 mL of isopropanol was slowly added to finely pulverised potassium hydroxide (4.6 g, 82.5 mmoles) with stirring. Stir the solution for at least 10 mins at room temperature to form a fine suspension and then add slowly chromium perchlorate (51.2 g, 100 mmoles) in 150 mL of isopropanol with vigorous mixing. Heat the resultant mixture to reflux for 60 min. After cooling the solution to room temperature, filter off the insoluble potassium salt with another 50 mL of isopropanol to form a dark green chromium metal complex. By the selection of capping groups, the excess of capping groups, solvent, excess of base and temperature, one can obtain combinations of different capping groups of which a hydrophobic capping group is one member.

Example 2: Binding of Metal-Coordination Complexes to Active Particles

Examples of a metal coordination complex activating different particles are described. For these studies, 1 g of active materials (particles) were dispersed in 40 ml of each of the above metal coordination complex solutions and sonicated utilizing an ultrasonic probe (Henan Chengyi Laboratory Equipment Co., Ltd, China) for 1 hr at 30% power and 3 s on/off cycle. The mixture is then filtered to dryness and then approximately 2.5 mg samples were transferred into 1.5 ml Eppendorf tubes and 1 ml of DI water added. After sonication, 10 μl was further diluted with 1 ml DI water, vortexed and immediately transferred into a zeta potential cuvette for measurement on a Malvern Nano ZS Zetasizer. The method for producing the Controls was the same except 40 ml of DI water was used instead of metal complex solution. In all samples investigated, there was a shift to positive charge in the zeta potential on reaction of nanoparticles with the metal coordination complexes.

Particle 1

In this example, silicon nanoparticles (100 nm, SAT nanoTechnology Material Co. Ltd., China) were treated with metal coordination complex solution (Solution 1). The Control (treated with water) gave a zeta potential measurement of −39.1 mV indicating that the surface was negatively charged. On treatment with the metal coordination complex solution, the zeta potential shifted to +28.2 mV indicating that the surface has changed its charge due to the presence of positively charged metal complexes on the nSi surface.

Particle 2

In this example, carbon (C65) nanoparticles (MTI CORP., USA) were treated with metal coordination complex solution (Solution 1). The Control (treated with water) gave a zeta potential measurement of −28.6 mV indicating that the surface was negatively charged. On treatment with the metal complex solution, the zeta potential shifted to +47.2 mV indicating that the surface has changed its charge due to the presence of positively charged metal complexes on the C65 surface.

Particle 3

In this example, silicon nanoparticles (100 nm, SAT nanoTechnology Material Co. Ltd., China) were treated with metal coordination complex solution (Solution 4, acetate capped, chromium perchlorate based, pH3.0). The Control (treated with water) gave a zeta potential measurement of −39.1 mV indicating that the surface was negatively charged. On treatment with the metal complex solution, the zeta potential shifted to −8.0 mV indicating that the nSi surface has coordinated with the metal complex but not as much as with Solution 1.

Particle 4

In this example, carbon (C65) nanoparticles (MTI CORP., USA) were treated with metal coordination complex solution (Solution 4, acetate capped, chromium perchlorate based, pH 3.0). The Control (treated with water) gave a zeta potential measurement of −28.6 mV indicating that the surface was negatively charged. On treatment with the metal complex solution, the zeta potential shifted to +46.3 mV indicating that the surface has changed its charge due to the presence of positively charged metal complexes on the C65 surface.

Particle 5

In this example, graphite (Hitachi, MAGE3) were treated with metal coordination complex solution (Solution 2). The Control (treated with water) gave a zeta potential measurement of −32.0 mV indicating that the surface was negatively charged. On treatment with the metal complex solution, the zeta potential shifted to +67.0 mV indicating that the surface has changed its charge due to the presence of positively charged metal complexes on the graphite surface.

Particle 6

In this example, graphite (Hitachi, MAGE3) was treated with metal coordination complex solution (Solution 4, acetate capped, chromium perchlorate based, pH 3.0). The Control (treated with water) gave a zeta potential measurement of −32.0 mV indicating that the surface was negatively charged. On treatment with the metal complex solution, the zeta potential shifted to +24.3 mV indicating that the surface has changed its charge due to the presence of positively charged metal complexes on the graphite surface.

Particles 7A-7E

For comparison purposes, the zeta potential and average size of silicon nanoparticles (100 nm, SAT nanoTechnology Material Co. Ltd., China) when treated with different oligomeric metal coordination complex solutions were compared. FIG. 1 shows the zeta potential for silicon activated with chromium perchlorate based oligomeric metal coordination complexes: A, formed at pH 4.5 per Solution 1; B, acetate capped but formed at pH 4.5; C formed at pH 3.0; D, acetate capped but formed at pH 3.0; and E, Control (water). Each sample was measured as a crude, after filtration and resuspension in water, and after one wash, filtration and resuspension in water. Each type of metal coordination complex (especially oligomeric metal coordination complex) gave different charge readings, but all gave some increase towards a positive charge. The results for A showed that the unmodified metal complexes bound strongly to the silicon while the results for B show that similarly strong binding is achieved using acetate capped complexes at the same pH. The results for C exemplify the effect that control over pH can have with the complexes being less strongly bound. This is further the case for D where the effect of washing is even greater on removal of the metal coordination complexes (especially oligomeric metal coordination complexes). Nonetheless, all examples have enough metal coordination complexes (especially oligomeric metal coordination complexes) bound to raise the zeta potential significantly. The results for C and D versus those for A and B indicate that a further level of control can be achieved over the reactivity of the activated nanoparticles by exercising a choice over the pH at which the metal complexes are formed, whether they are additionally capped or not and by choosing the type of capping group used.

Figure 2:
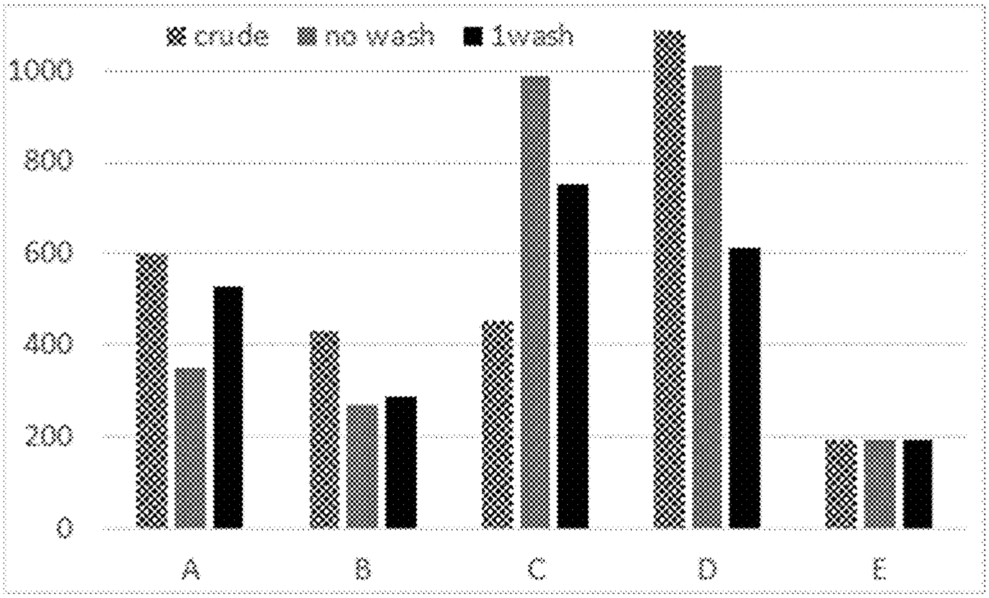
FIG. 2 shows the sizes of different activated particles: A—at pH 4.5; B—acetate capped at pH 4.5; C—at pH 3.0; D—acetate capped at pH 3.0; and E—Control showing that with lower pH conditions, the total surface charge is closer to neutral which leads to more aggregation of particles.

FIG. 2 shows the sizes of different activated particles: A, formed at pH 4.5 per Solution 1; B, acetate capped but formed at pH 4.5; C formed at pH 3.0; D, acetate capped but formed at pH 3.0; and E, Control (water). As shown, the lower pH versions (C and D) gave a larger particle size distribution, indicative of particle aggregation and cross-linking. In each case, the acetate capped versions when compared to their uncapped analogues gave larger cluster sizes indicating pH and capping are providing different characteristics to the basic metal coordination complexes (especially oligomeric metal coordination complexes). As discussed, both capping and pH selection can be employed, separately or together, to appropriately modify the reactivity of the metal coordination complexes (especially oligomeric metal coordination complexes) while still achieve binding to active materials.

Particles 8A-8F

Figure 3:
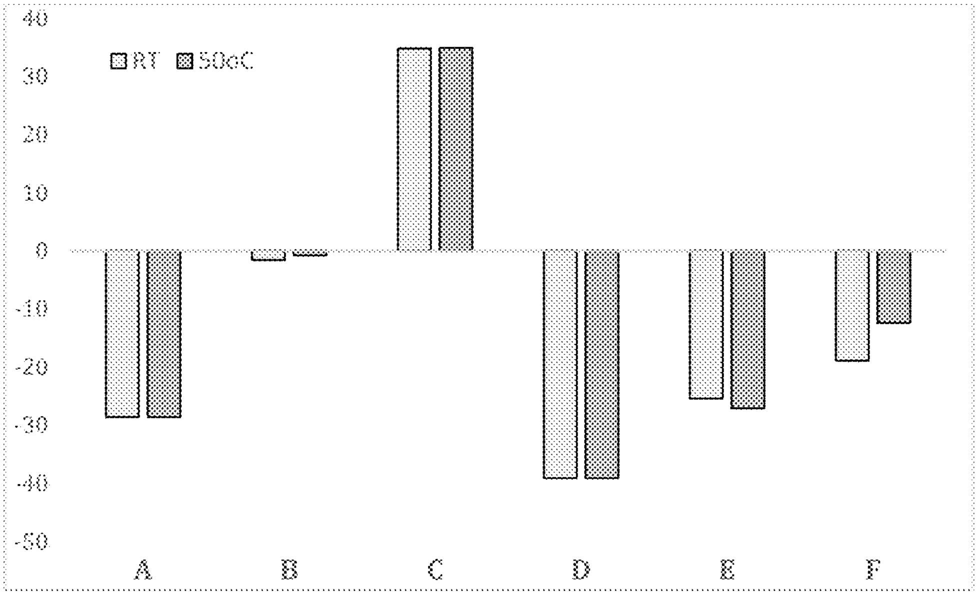
FIG. 3 shows the zeta potential measurements of: A—C65 carbon nanoparticles (Control); B—C65 carbon nanoparticles with chromium acetate at pH 4.0 (Solution 6); C—C65 carbon nanoparticles and acetate capped at pH 3.0 (Solution 4); D—Silicon nanoparticles (Control); E—Silicon nanoparticles with chromium acetate at pH 4.0 (Solution 6); and F—Silicon nanoparticles and acetate capped at pH 3.0 (Solution 4). As shown by zeta potential measurements, when particles are treated with relatively weaker binding metal coordination complexes and washed, there is still binding of the metal complexes to the particles.

For comparison purposes, the zeta potential of silicon nanoparticles (100 nm, SAT nanoTechnology Material Co. Ltd., China) and carbon (C65) nanoparticles (MTI CORP., USA) when treated with chromium acetate (Solution 6) and acetate capped chromium perchlorate formed at pH3.0 (Solution 4) were compared. FIG. 3 shows the zeta potential for both silicon and carbon particles. With addition of Solution 4 gives Si data comparable to those in FIG. 1D indicating binding though not as strong as non-capped, higher pH versions. Solution 6 with nSi (D) also indicate binding though not as strong as those for Solution 4. The same trends are observed for C65 carbon with Solution 4 showing binding to give a strongly positive zeta potential while chromium acetate (Solution 6) gives a charge near neutral.

Particles 9A-9I

While modified metal coordination complexes can bind to many different particles, surface modification of such particles can also change the reactivity of modified metal coordination complex binding. In this example, silicon micron particles (SFS, 5 μm; "μSi particles") were treated with metal coordination complex solution (Solution 1), and then coated with polyacrylic acid (PAA) to form a PAA coated particles. In brief, 1 g of μSi was mixed into 40 mL of Solution 1 and left overnight (O/N) on a roller. After filtering, 40 mL of 0.05% wt 250 kPAA solution (partially neutralize to pH 5.3) was added to the metal complex activated μSi particles. After mixing O/N on a roller, carboxylic acid coated μSi particles are formed for further modification, as required. Similarly, any active particle can be surface modified to tune binding of modified metal coordination complexes.

Figure 4:
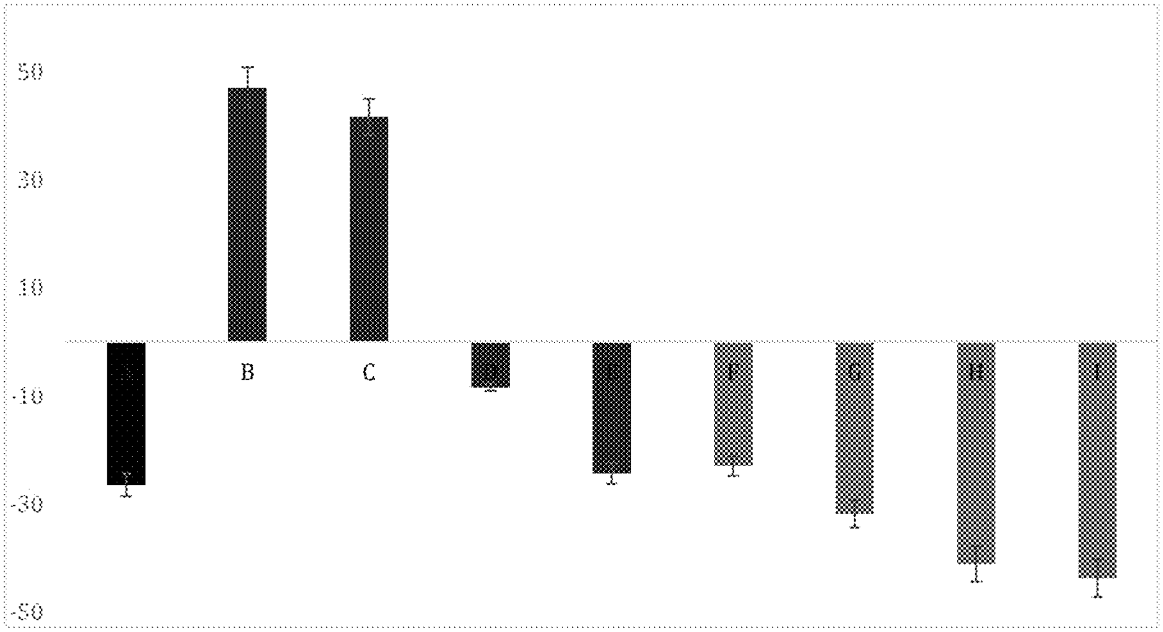
FIG. 4 shows the zeta potential variations due to the use of different metal complexes on polyacrylic acid (PAA) coated µSi particles. PAA coated µSi (A), is activated with Solution 1 (B); Solution 4 (acetate capped, pH 4.5) (C); Solution 5 (oxalate capped, pH 3.0) (D); Solution 6 (pH 4.0) (E). Depending to the capping groups, the charge of the particles has changed, and they are all sufficiently reactive to bind more PAA. F, G, H, and I show the zeta potential of PAA coated B, C, D and E. As shown, addition of PAA has shifted zeta potential to be more negative (from B to F, C to G, D to H, and E to I, respectively) in all cases.

FIG. 4 shows the variations due to the use of different metal complexes on activating the above PAA coated μSi particles. PAA coated μSi (A), is activated with Solution 1 (B); Solution 4 (acetate capped, pH 4.5) (C); Solution 5 (oxalate capped, pH 3.0) (D); Solution 6 (pH 4.0) (E). Depending to the capping groups, the charge of the particles has changed, and they are all sufficiently reactive to bind more PAA. F, G, H, and I show the zeta potential of PAA coated B, C, D and E. Although the reactivities of the metal complexes are decreased, all metal complexes (F to I) on μSi particles (active material) are still able to bind PAA polymer under these relatively dilute conditions.

Example 3: Reaction of Metal Coordination Complexes with Polymer Binders

Examples of different metal coordination complexes with polymer binders are described.

Example 3a

Figure 5:
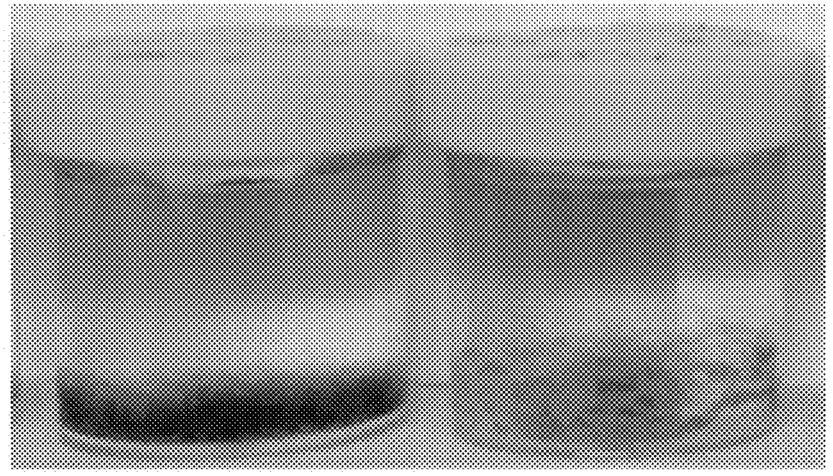
FIG. 5 shows the differences, due to pH, of metal complexes when added to a CMC solution. The left vial is a picture after addition of Solution 1, pH 4.5 and showing a greenish precipitated metal salt in the CMC solution. In comparison, the right vial (addition of Solution 2, pH 3.0) gave polymer precipitates indicative of rapid intra- and inter-molecular cross-linking of the CMC but with poor homogeneity.

In this example, pH differences, i.e., Solution 1 (pH 4.5) vs Solution 2 (pH 3.0) were compared. In brief, Sodium CMC (supplied by MTI) was dissolved in deionised water to form a 2 wt % solution at pH 6 to 6.5. Into 30 g of this aqueous binder, 1 ml (for 100 mM) or 2 ml (for 50 mM) of metal coordination complexes (ratio of 25:1) were added with stirring and mixed in a shear mixer. As shown in FIG. 5, Solution 1 (left image) immediately precipitated to give a greenish precipitated metal salt. Solution 2 (right image) gave polymer precipitates indicative of intra- and inter-molecular cross-linking of the CMC but with poor homogeneity.

Example 3b

Figure 6:
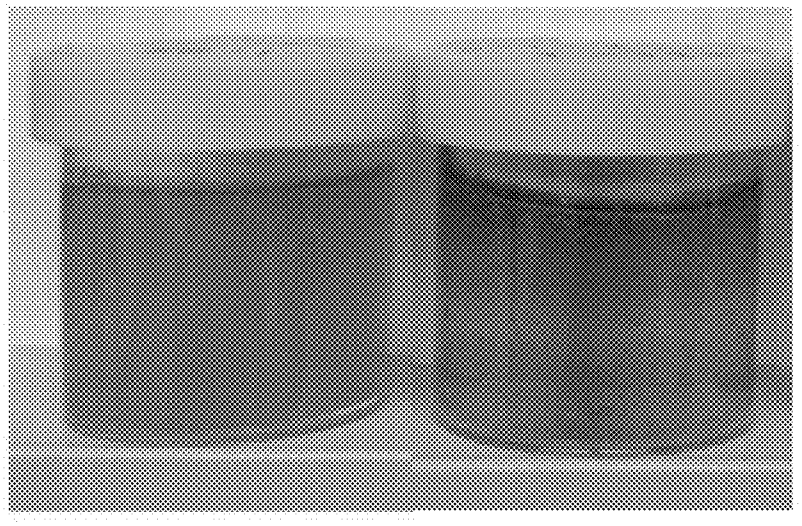
FIG. 6 shows the differences, due to pH, of acetate capped metal complexes when added to a CMC solution. The left vial is a picture after addition of acetate capped Solution 4, pH 4.5, still showing presence of some greenish precipitated metal salt in the CMC solution. In comparison, the right vial which is acetate capped Solution 4, pH 3.0, gave a clear uniform gel suggesting metal complex cross-linking of CMC was far more uniform compared to use of uncapped metal complex versions.

In this example, the effect of acetate capping to Solution 4 (pH 4.5) and to Solution 4 (pH 3.0) was compared. In brief, Sodium CMC (supplied by MTI) was dissolved in deionised water to form a 2 wt % solution at pH 6 to 6.5. Into 30 g of this aqueous binder, 1 ml (for 100 mM) or 2 ml (for 50 mM) of metal complexes (ratio of 25:1) were added with stirring and mixed in a shear mixer. As shown in FIG. 6, acetate capping Solution 4 at pH 4.5 (left image) still formed greenish precipitates but acetate capped Solution 4 at pH 3.0 (right image) formed a homogeneous solution that gelled over time.

Example 3c

Figure 7:
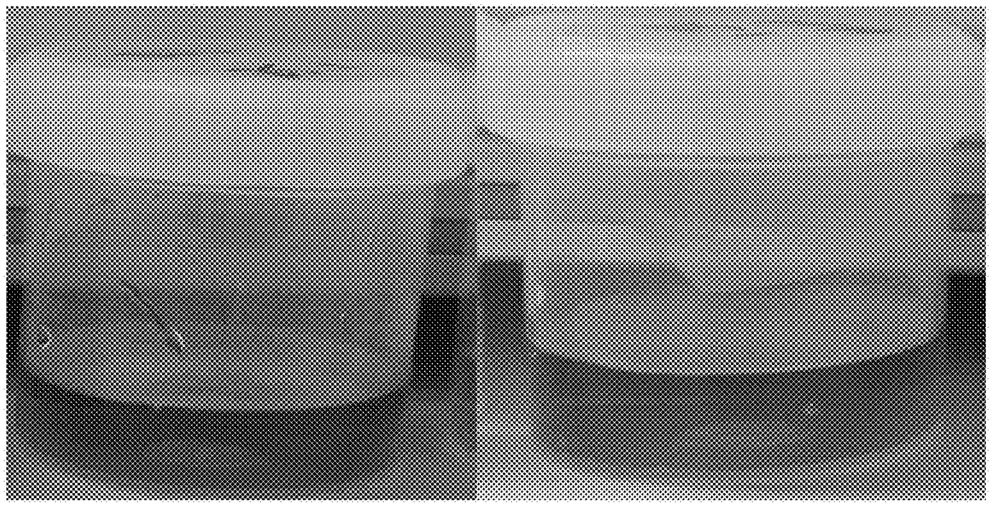
FIG. 7 shows the differences, due to pH, of metal complexes when added to a CMC solution. The left vial is a picture after addition of Solution 6, pH 4.5, compared to the right vial which is Solution 6, pH 3.0. On addition of the metal complex solution, both solutions remained homogeneous and did not visually change their viscosity at room temperature. However, on heating to 50° C., both turned into solid gels.

In this example, chromium acetate (Solution 6) at pH 3.0 and 4.5 were compared. In brief, Sodium CMC (supplied by MTI) was dissolved in deionised water to form a 2 wt % solution at pH 6 to 6.5. Into 30 g of this aqueous binder, 2 ml of Solution 1 at pH 3.0 and 4.5 (ratio of 25:1) were added with stirring and mixed in a shear mixer. Addition of the metal complex solution did not visually change the solution viscosity at room temperature. However, on heating to 50° C., both turned into solid gels (FIG. 7).

Example 3d

Figure 8:
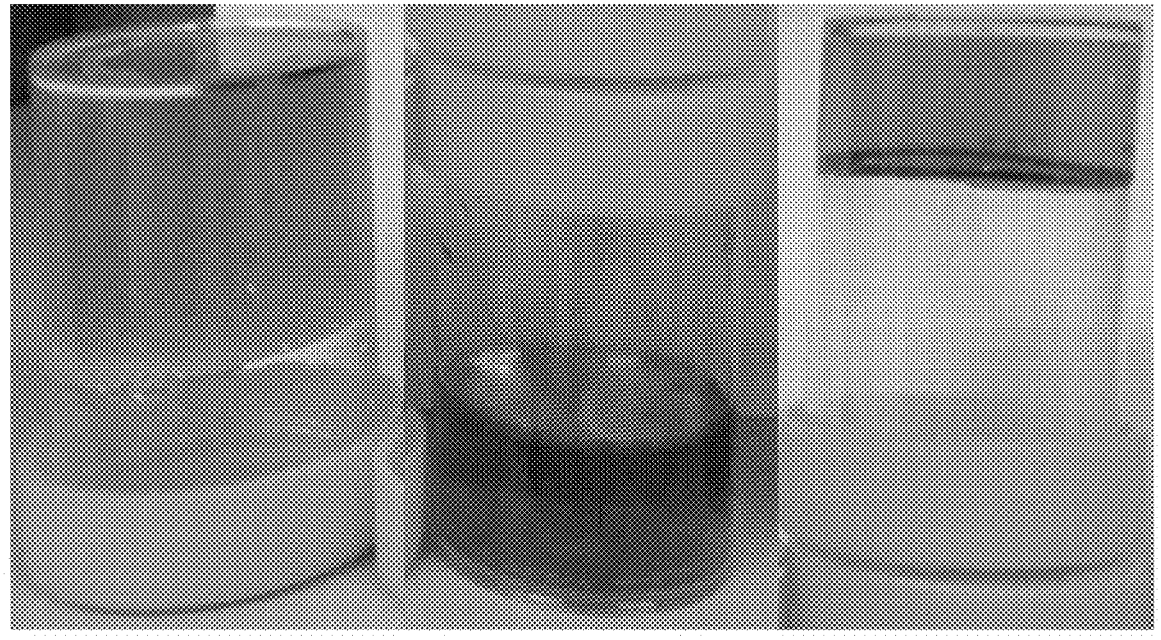
FIG. 8 shows the differences in curing time with varying pH and metal coordination complex types when added to an alginate solution. The left vial is a picture after addition of acetate capped Solution 4, pH 3.0 after 20 mins at room temperature. The middle vial is Solution 6, pH 3.0 at room temperature and the right vial is the same mixture after approximately 5 hrs heating to 50° C. On addition of the different metal coordination complex solutions, different gelling rates were observed with time and temperature.

In this example, Sodium alginate solutions treated with metal complexes: In brief, alginic acid sodium salt from brown algae, medium viscosity (supplied by Sigma Aldrich) was dissolved in deionised water to form a 2 wt % solution at pH 6 to 6.5. Into 30 g of this aqueous binder, 1 ml (for 100 mM) or 2 ml (for 50 mM) of metal complexes (ratio of 25:1) were added with stirring and mixed in a shear mixer. Addition of acetate capped Solution 4 (pH 3.0) formed polymer precipitates which turned into a gel within 20 minutes (left image). Addition of Solution 6 (chromium acetate at pH4.2), remained visually homogeneous and did not gel at room temperature (middle image). But as with CMC solutions, it formed a gel after heating to 50° C. (right image) (FIG. 8).

Example 3e

Figure 9:
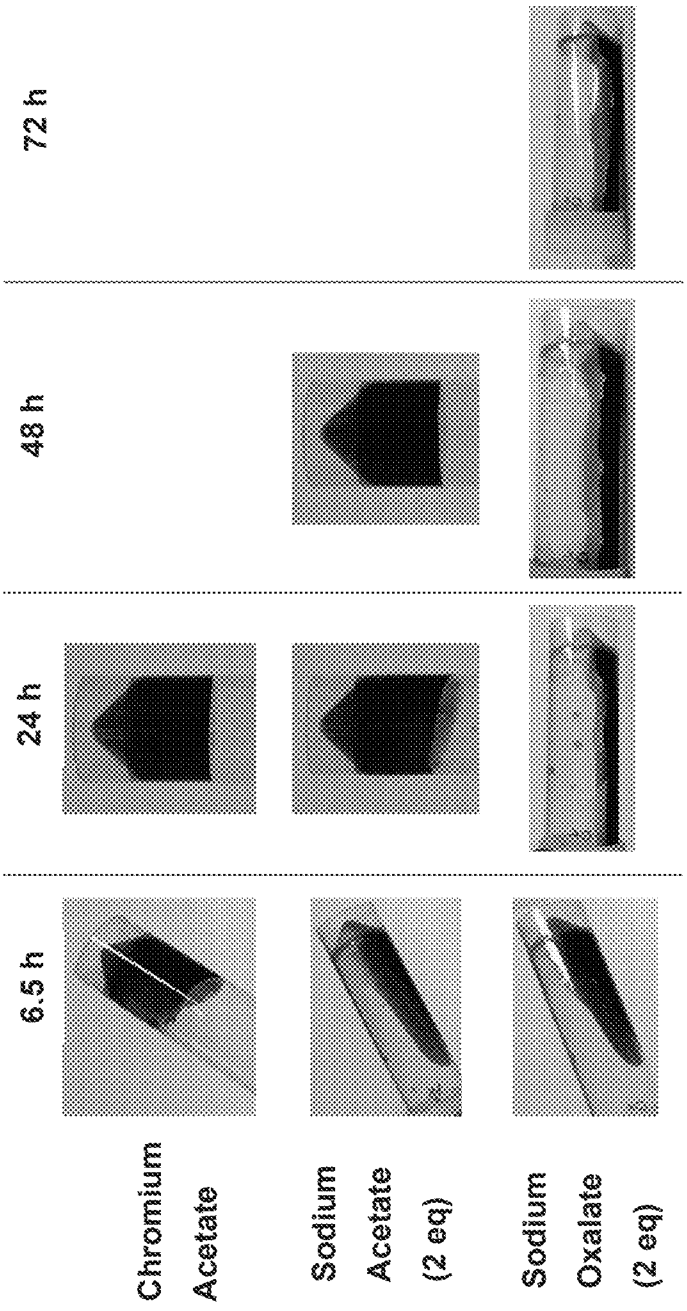
FIG. 9 shows a comparison in curing time of a polyacrylic acid solution using chromium acetate (Solution 6), and chromium acetate solution capped with two equivalents of sodium acetate and sodium oxalate. By 24 hours, the polyacrylic acid solution has been cross-linked by chromium acetate. However with further acetate capping groups, 48 hours is required to form a solid gel. The addition of oxalate capping groups does not give a solid gel even after 96 hours.

In this example, chromium acetate (Solution 6) capped with further two equivalents of sodium acetate and sodium oxalate were compared with uncapped chromium acetate. In brief, a 15 wt % solution of polyacrylic acid, 50% neutralized with lithium hydroxide (Sigma Aldrich, USA), was prepared from poly(acrylic acid) powder, average MW 250,000 (Sigma Aldrich, USA). Into 4 g of this aqueous binder, 2 g of metal salt solution (ratio of 20:1) were added. The mixture was agitated on a vortex mixer and left standing at room temperature. By 24 hours, the polyacrylic acid solution has been cross-linked by chromium acetate. But if further capping groups are added, there is a further delay in the gelling of the polyacrylic acid solution. As expected, the oxalate capping group is even more effective than the extra addition of acetate capping group (FIG. 9).

As shown in FIGS. 5 to 9, different metal coordination complexes can be designed/modified to have different reactivities so that they can rapidly cross-link or decrease its reactivity to have minimal change in viscosity for some time period prior to curing. The degree of cross-linking and its temperature dependence in curing can be controlled by the selection of appropriate metal coordination complexes (and possibly in combination with different capping groups).

Example 4: Reaction of Two Active Materials with a Polymer Binders with Metal-Coordination Complex Solutions Examples of different metal complexes in slurry formulations are described.

Example 4a

Figure 10:
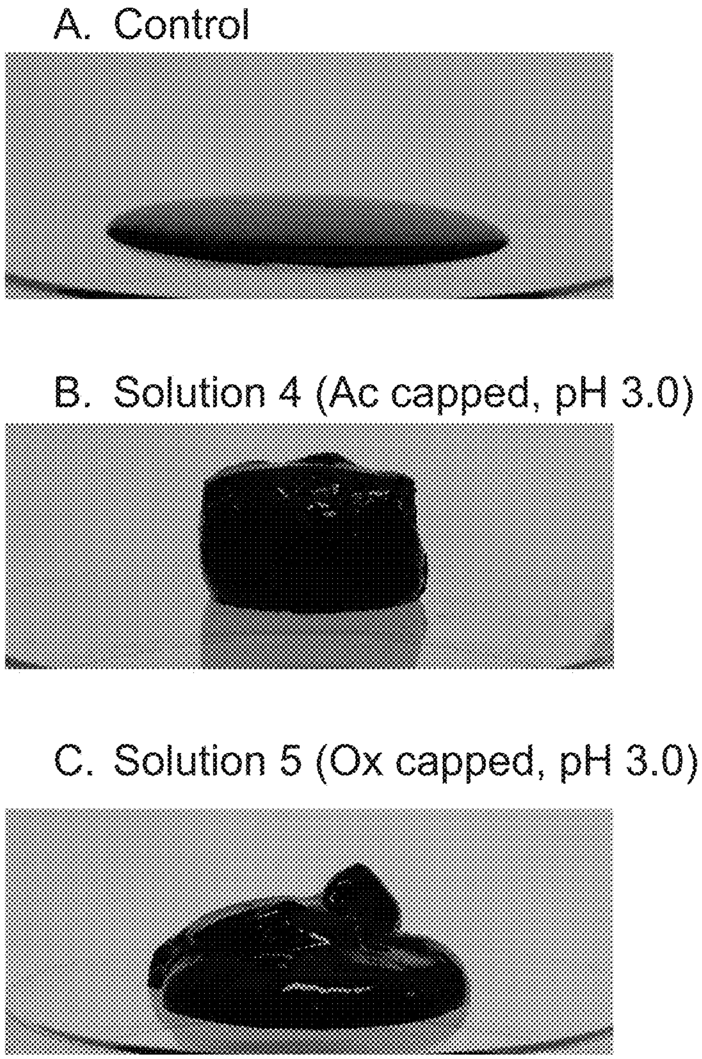
FIG. 10 shows the effect of different strength capping agents in a slurry formation comprising 70% µSi, 15% C65, 15% PAA binder solution (Example 4a) after 24 hrs at room temperature (RT). Addition of either B., acetate capped (pH 3.0) or C., oxalate capped (pH 3.0) metal complexes, leads to increased cross-linking over time. The more strongly bound capping agent (oxalate) gave a softer gel under the same conditions. In contrast, A., Control (water) did not lead to any change in viscosity with time.

In brief, 3 g Super C65 (MTI CORP., USA) was dispersed in 27.3 g of poly(acrylic acid) 11 wt % stock solution, 25% neutralized with lithium hydroxide (Sigma Aldrich, USA), prepared from poly(acrylic acid) powder, average MW 450,000 (Sigma Aldrich, USA), under vigorous stirring in a shear mixer (IKA T25, Germany). 14 g of micron silicon powder (SilicioFerroSolar, Spain) and 17.5 g of DI water were added and dispersed under further vigorous stirring. The mixture was stirred with an overhead mixer (VMA-Getzmann Dispermat, Germany) and 4.9 g of metal complex solution or water were added dropwise. After finishing of the addition, mixing continued for further 5 minutes. As shown in FIG. 10, that addition of water (A. Control) did not show any cross-linking. In comparison both acetate capped (Solution 4, pH 3.0) and oxalate capped (Solution 5, pH 3.0) show increased rigidity due to cross-linking. As expected, the more strongly bound capping agent (oxalate) gave a softer gel under the same conditions.

Example 4b

Figure 11:
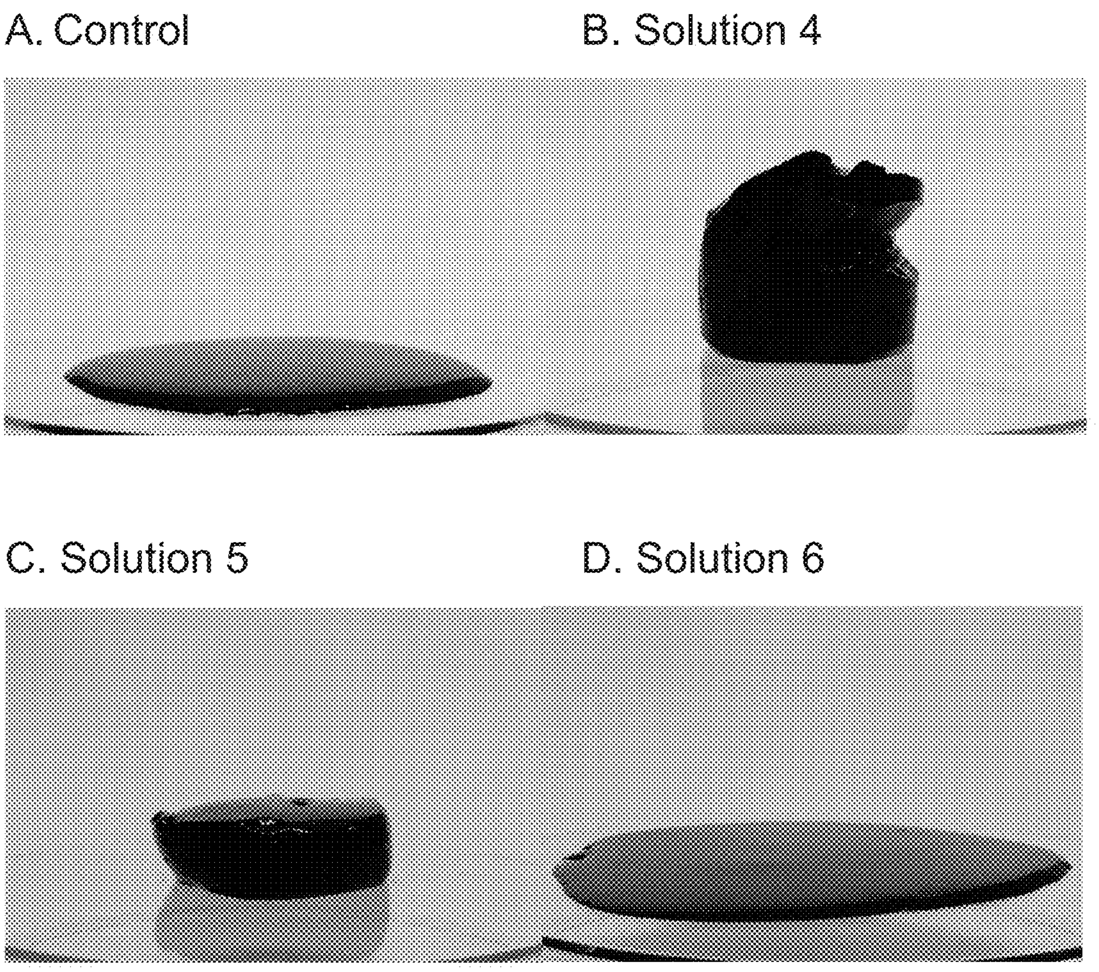
FIG. 11 shows the effect of different strength capping agents in a slurry formation comprising 70% µSi, 15% C65, 15% alginate binder solution (Example 4b) after 24 hrs at RT. Addition of either B., acetate capped (pH 3.0) or C., oxalate capped (pH 3.0) metal complexes, leads to increased cross-linking over time. The more strongly bound capping agent (oxalate) gave a softer gel under the same conditions. In contrast, A., Control (water) did not lead to any change in viscosity with time. Addition of D., chromium acetate (Solution 6) gave slurries similar to the Control at RT.

In brief, 1.2 g Super C65 (MTI CORP., USA) was dispersed in 40 g of sodium alginate 3 wt % stock solution, made from sodium alginate powder (Sigma Aldrich, USA), under vigorous stirring in a shear mixer (IKA T25, Germany). 5.6 g of micron silicon powder (SilicioFerroSolar, Spain) were added and the mixture was stirred with an overhead mixer (VMA-Getzmann Dispermat, Germany) for 5 minutes. Mixing was continued and 4.85 g of metal complex solution or water were added dropwise. After finishing of the addition, mixing continued for further 5 minutes. As shown in FIG. 11, that addition of water (A. Control) did not show any cross-linking. In comparison both B., acetate capped (Solution 4, pH 3.0) and C., oxalate capped (Solution 5, pH 3.0) show increased rigidity due to cross-linking. Similar to Example 4a with PAA binder, the more strongly bound capping agent (oxalate) gave a softer gel under the same conditions.

Example 4c

In brief, nano silicon powder, 10.34 g (100 nm, SAT nano Technology Material Co., Ltd., China) and conductive carbon black Super C65, 2.61 g (MTI CORP., USA) were dispersed in 450 ml of DI water, using 0.07 g of Triton-100 (Sigma, USA). The suspension of solids was sonicated in Ultrasonic Processor (Henan Chengyi Laboratory Equipment Co., Ltd, China) at 70% power for 1 hour. After sonication 266.0 g of lithiated to pH=4.6 polyacrylic acid 1% stock solution prepared from poly(acrylic acid) powder, average MW 450,000 (Sigma-Aldrich, USA) was added under vigorous stirring in a Shear Mixer (IKA T25, Germany). After poly(acrylic acid) addition 34.7 g of chromium acetate capped metal complexes (Solution 4, 50 mM at pH 2.3) were added under stirring in the Shear Mixer.

The final suspension volume 750 ml was stirred for 15 min at 25,000 rpm and spray dried in laboratory spray dryer (Buchi-290, Switzerland) using following settings:

Inlet temperature 210° C.

Gas flow 35 mm

Aspirator 100%

Feed rate 50%

The dried Composite powder (11.2 g) was collected and included in the preparation of slurries.

Firstly, 0.7 g of carboxymethyl cellulose (CMC, 400,000 g/mol), sourced from MTI, is hydrated in 35 g of water using a shear mixer, then 1.6 g of C65 is added to the CMC solution and dispersed with the shear mixer. This was followed by the addition of the silicon-based composite particle formed above and dispersed with an overhead mixer (Dispermat). 20 g of natural graphite is then mixed using the dispermat, and finally 0.4 g of styrene butadiene rubber (SBR) sourced from MTI is added to the mixture and mixed for the next 10 min.

Figure 12A:
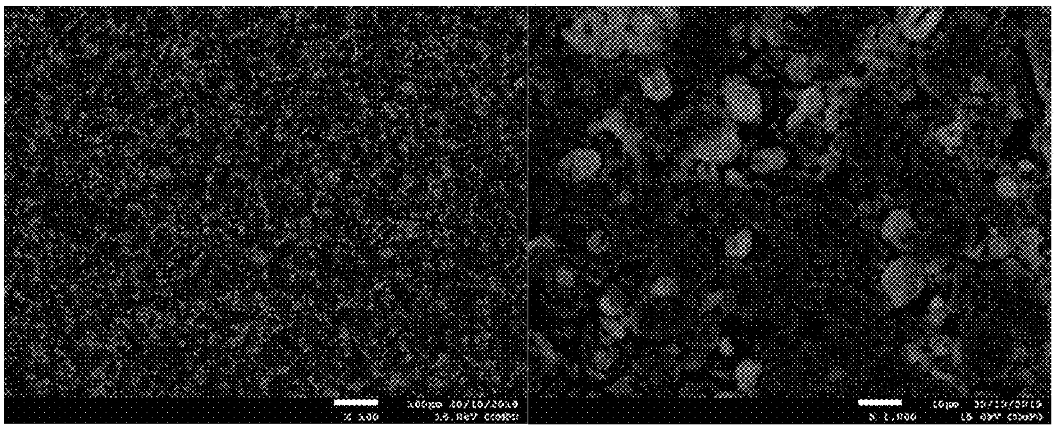
FIG. 12 shows SEM images of particles formed in Example 4c after slurry preparation and casting onto a copper foil. Left images are SEM Magnification at scale of 100 microns and right images are at 1000 micron scale. Particles formed with modified metal coordination complexes FIG. 12A and FIG. 12B have not degraded under anode fabrication conditions. Particles formed without modified metal coordination complexes (FIG. 12C) via spray drying immediately break apart under the same conditions.
Figure 12B:
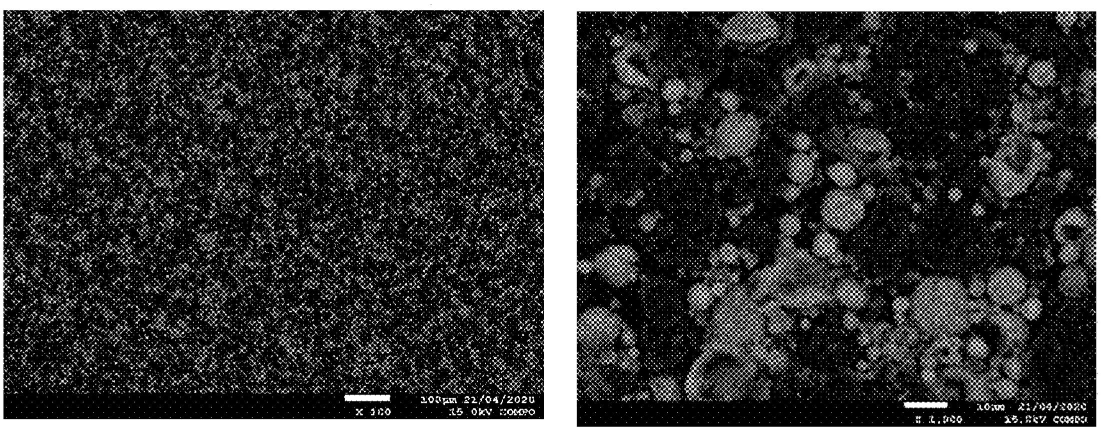
Figure 12C:
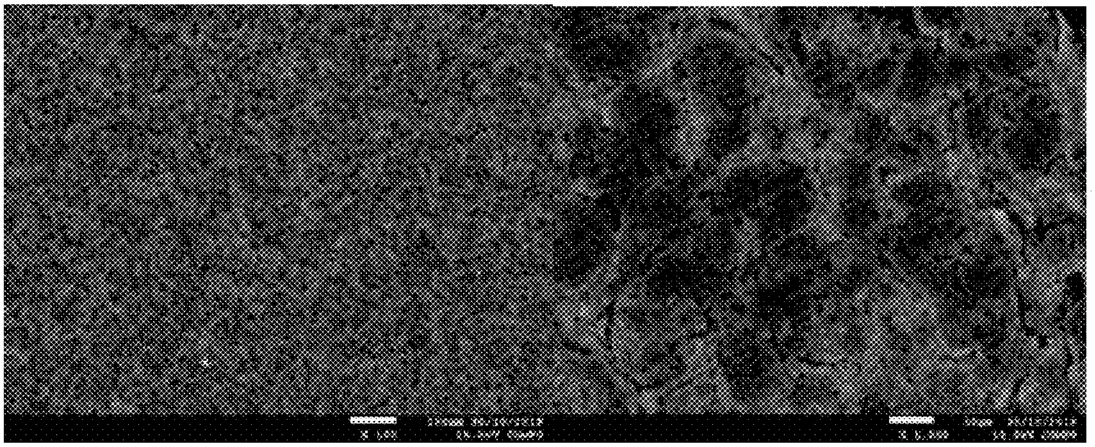

FIGS. 12A, 12B and 12C shows SEM images of particles after slurry preparation and casting onto copper foil. Particles formed with one modified metal coordination complex, Solution 4 (A) have not degraded under anode fabrication conditions allowing for their incorporation into anode materials. Similarly, another modified metal complex, Solution 6 (B) particles did not degrade. With unmodified metal coordination complex, Solution 1 (C), any particles formed via spray drying immediately break apart under the comparable conditions. This clearly shows that methods of the present invention using modified oligomeric metal coordination complexes led to intra- and intermolecular cross-linking of the polyacrylic acid binder, and also cross-linking of the silicon and possibly the carbon particles with the polyacrylic acid binder to form highly interconnected composite particles, as defined herein, which are suitable for subsequent use in anode formation.

Example 5: Reaction of Active Materials, Polymer Binder and Current Collector with Metal-Coordination Complex Solutions An electrode slurry with a composition of 20/74/4/2 Si/graphite/binder/conductive aid was prepared as follows: A 2 wt % aqueous solution of 1.3 g sodium CMC (supplied by MTI) was prepared by dissolving sodium CMC in deionized water. 0.65 g of C65 (supplied by MTI) was added and the mixture was homogenized on a shear mixer. Into 50.5 g of the sodium CMC/C65 mixture 5 g micro-silicon (supplied by SFS) was added and mixed on a "Dispermat" over-head stirrer for 15 minutes. 18.5 g graphite were added, and the mixture mixed for a further 7 minutes. The acetate capped metal coordination complexes (Solution 4, pH 3.0, 4.875 gm of 17 mM and 4.85 gm of 33 mM solutions) were then added dropwise as a drop-in additive and mixed for a further 8 mins, and then 3 mL of the slurry were applied to a copper current collector foil and coated with a doctor blade at a height of 90 μm. The coating was dried at 60° C. for 10 minutes.

Figure 13:
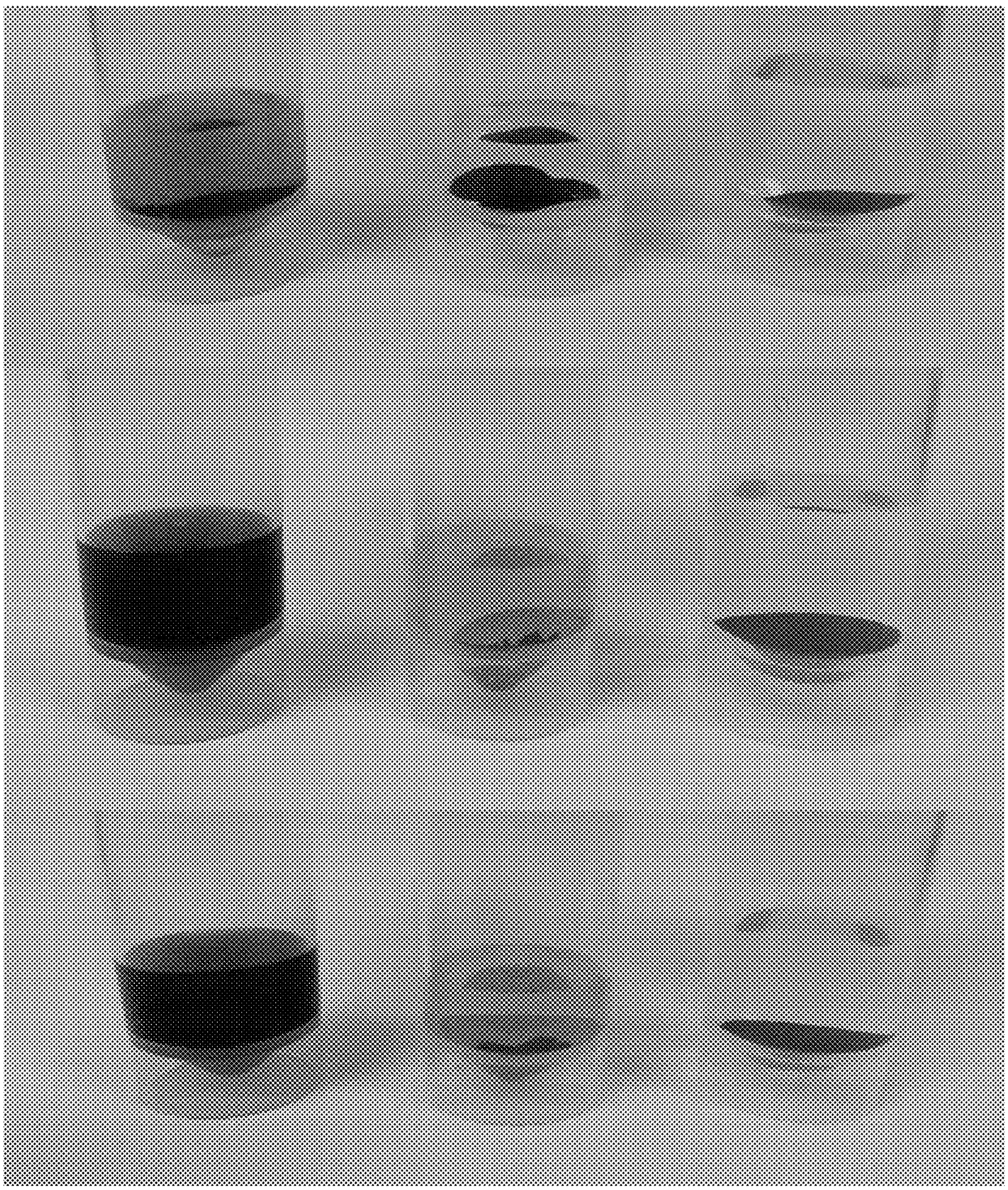
FIG. 13 is a series of photographs of micro-silicon/graphite-containing electrodes submerged in water. Left images: untreated electrode slurry; Middle images: cross-linked electrode slurry with a binder:cross-linker ratio of 50:1; Right images: cross-linked electrode slurry with a binder:cross-linker of 25:1. Top row of images: immediately after submerging; Middle row of images: after 15 minutes; Bottom row of images: after 5.5 hours.

Micro-silicon/graphite containing electrodes were submerged in water to test adhesion of the dried slurry on the current collector. As shown in FIG. 13, the untreated electrode slurry (Leftmost vertical images); cross-linked electrode slurry with a binder to metal complex ratio of 50:1 (middle vertical images); and (rightmost vertical images) cross-linked electrode slurry with a binder to metal complex ratio of 25:1. The progression of images in the horizontal rows: (Top) shows the electrode immediately after submerging in water; (Middle) shows the electrode after 15 min submerging in water; and (Bottom) shows the electrode after 5.5 hours submerging in water. FIG. 13 indicates that the adhesion and cohesion of the electrode without any metal complex cross-linker (Left) was poor and immediately started dispersing and within 15 mins, delaminated from the Cu current collector and the slurry mix dispersed into the aqueous solution. With the addition of a metal complex cross-linker in the ratio of 50:1 (Middle), there was delamination off the current collector but the slurry maintained its cohesion. Even after 5.5 hrs, this example still showed cohesion in the structure, though it was breaking up into fragments with time. With the addition of a metal complex cross-linker in the ratio of 25:1 (Right), there was no delamination off the current collector and the slurry maintained its cohesion and adhesion even after 5.5 hrs. It should be noted that the aqueous solution tested in this example is far more extreme than for ordinary battery applications, where there is no water to compete against and weaken the adhesion of the dried slurry off the current collector. This is just one version of a modified metal complex and only cured at 60° C. for 10 mins and not normal drying conditions where temperatures of 100 to 150° C. are common.

As shown in FIG. 12A, certain modified metal complexes that were able to bind to active materials was, in parallel, also forming both inter- and intramolecular cross-linking of the polymer binder. In FIG. 13, these same modified metal complexes also, in parallel, bound to the copper current collector. Without wishing to be bound by theory, the inventors believe that this example forms a cured conductive binder material comprising dative bonds between the metal of the at least one modified metal coordination complex and both the at least one active material and the at least one polymer binder.

Example 6: Electrochemical Data on Metal Complex Cured Electrode Slurries

Performance differences between modified metal complex cured slurries were compared to slurries without the addition of the metal complex. In each case, the metal complex (Solution 6) was added dropwise as the last step before applying to copper current collector. In this case, there was no obvious processing difference between the metal complex added slurry vs control when used that day. However, if the slurries were left too long, such as overnight, the metal complex cured slurries could not be used as they have set and gone rigid.

Example 6a. Using Anodes with μSi Particles and PAA Binder

In this example an electrode slurry with a composition of 70/20/2/8 silicon/graphite/conductive aid/binder was prepared. A 20 wt % solution of polyacrylic acid, 25% neutralized with lithium hydroxide (Sigma Aldrich, USA), was prepared from poly(acrylic acid) powder, average MW 250,000 (Sigma Aldrich, USA). 10 g of the poly(acrylic acid) solution were mixed with 0.5 g of C65 and 10.2 g of deionized water on a Thinky ARE-250/310 mixer for 2×2 minutes at 2,000 rpm. 17.5 g of micro-silicon (supplied by SFS) was added and the mixture mixed 2×2 minutes at 2,000 rpm. 5 g of graphite (Imerys TIMCAL KS6) was added and the mixture mixed 2×2 minutes at 2,000 rpm. The mixture was transferred to a "Dispermat" over-head stirrer and mixed at 6,000 rpm. Modified metal complex, Solution 6 was added dropwise, and the mixture kept mixing for further 5 minutes. In the case of the Control, water was added dropwise. The slurry was applied to a copper current collector foil and coated with a doctor blade at a height of 25 μm. The coating was dried at 60° C. for 10 minutes. The slurry remained processable without signs of gelation or thickening throughout processing.

Electrodes were calendered, cut, and dried up to 110° C. under vacuum for coin cell assembly. Lithium (Li) metal was used as the counter electrode and 1M $LiPF_6$ in ethylene carbonate (EC)/ethyl-methyl carbonate (EMC)/di-ethyl carbonate (DEC) (3/5/2 vol %)+1 wt % vinylene carbonate (VC)+10 wt % fluoroethylene carbonate (FEC) was used as electrolyte for the coin cell assembly. For charge/discharge cycling tests, the coin cells were activated at 0.05 C (1 C=3700 mA/g) for 1 cycle and at 0.1 C for 2 cycles, and then cycled at 0.5 C for long term stability testing. The C rates were based on the mass of active material (Si particles, graphite) in the electrodes. The voltage range for charge/discharge tests was 0.005-1.5 V vs. Li. The charge/discharge tests were conducted on Neware multi-channel battery testers controlled by a computer. Three replicate cells were made and tested for each condition.

Figure 14:
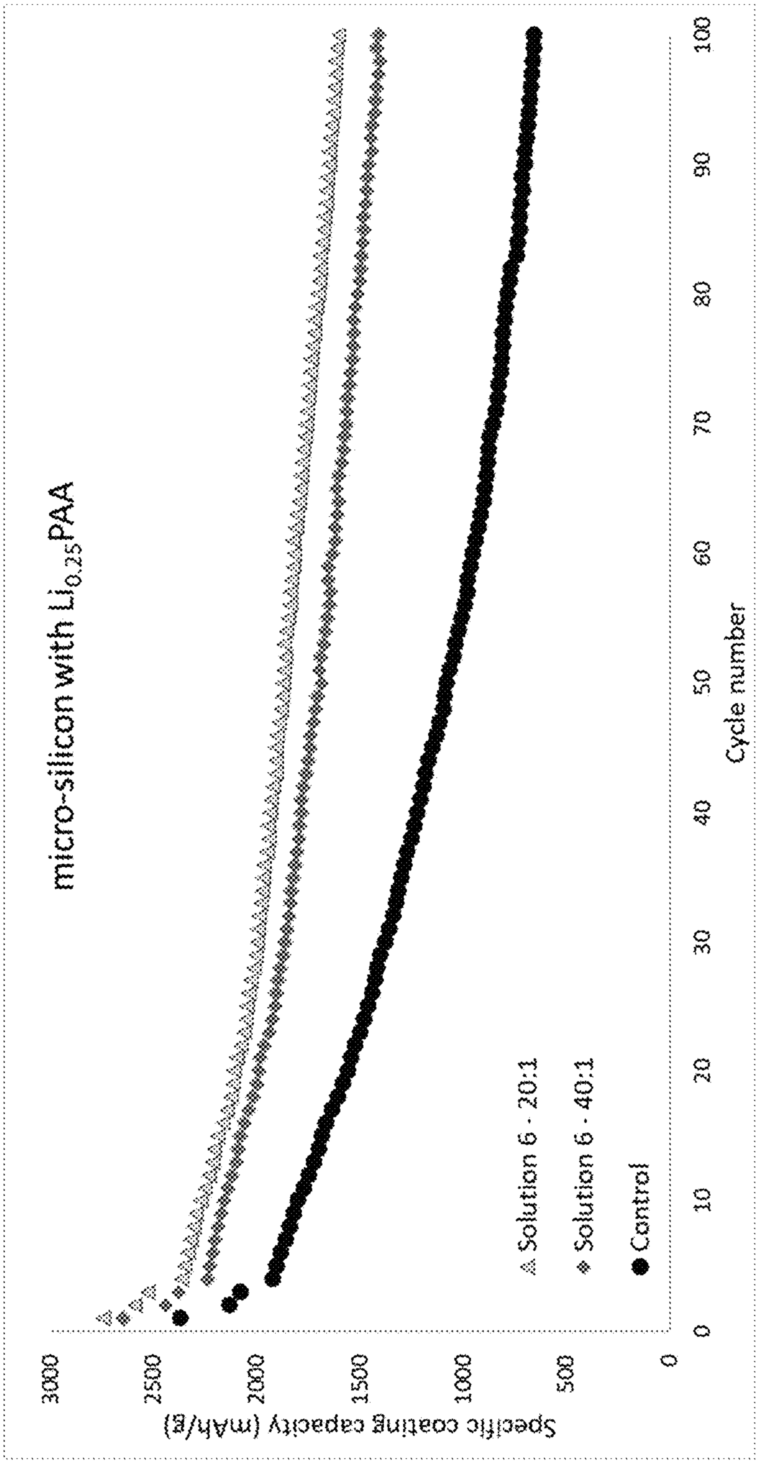
FIG. 14 shows the electrochemical cycling performance of lithium-ion coin cells with an electrode composition containing micro-silicon in half-cell configuration. The cycling graphs for electrodes without (Control) and with metal complex (Solution 6) at two different ratios are depicted.

FIG. 14 shows the electrochemical cycling performance of lithium-ion coin cells with an electrode composition of micro-silicon/graphite/C65/$Li_{0.25}$PAA (250 kDa) 70/20/2/8 wt % in 1M $LiPF_6$ in EC/EMC/DEC (3/5/2 vol %)+1 wt % VC+10 wt % FEC in half-cell configuration. The cycling graphs for electrodes without (Control) and with metal complex (Solution 6) at two different ratios are depicted.

Example 6b. Using Anodes with Carbon Coated Silicon Oxide Particles

In this example an electrode slurry with a composition of 80/10/10 silicon oxide/conductive aid/binder was prepared. A 20 wt % solution of polyacrylic acid, 25% and 80% neutralized with lithium hydroxide (Sigma Aldrich, USA), was prepared from poly(acrylic acid) powder, average MW 250,000 (Sigma Aldrich, USA). 12.5 g of the poly(acrylic acid) solution were mixed with 2.5 g of C65 and 4.12 g of deionized water on a Thinky ARE-250/310 mixer for 2×2 minutes at 2,000 rpm. 20 g of carbon-coated silicon oxide (Osaka Titanium Corporation, Japan) was added and the mixture mixed 2×2 minutes at 2,000 rpm. The mixture was transferred to a "Dispermat" over-head stirrer and mixed at 6,000 rpm. 8.5 g of metal complex (Solution 6) were added dropwise, and the mixture kept mixing for further 5 minutes. In the case of the Control, water was added dropwise. The slurry was applied to a copper current collector foil and coated with a doctor blade at a height of 60 μm. The coating was dried at 60° C. for 10 minutes. The slurry remained processable without signs of gelation or thickening throughout processing.

Electrodes were calendered, cut, and dried up to 110° C. under vacuum for coin cell assembly and tested as previously described. Three replicate cells were made and tested for each condition.

Figure 15:
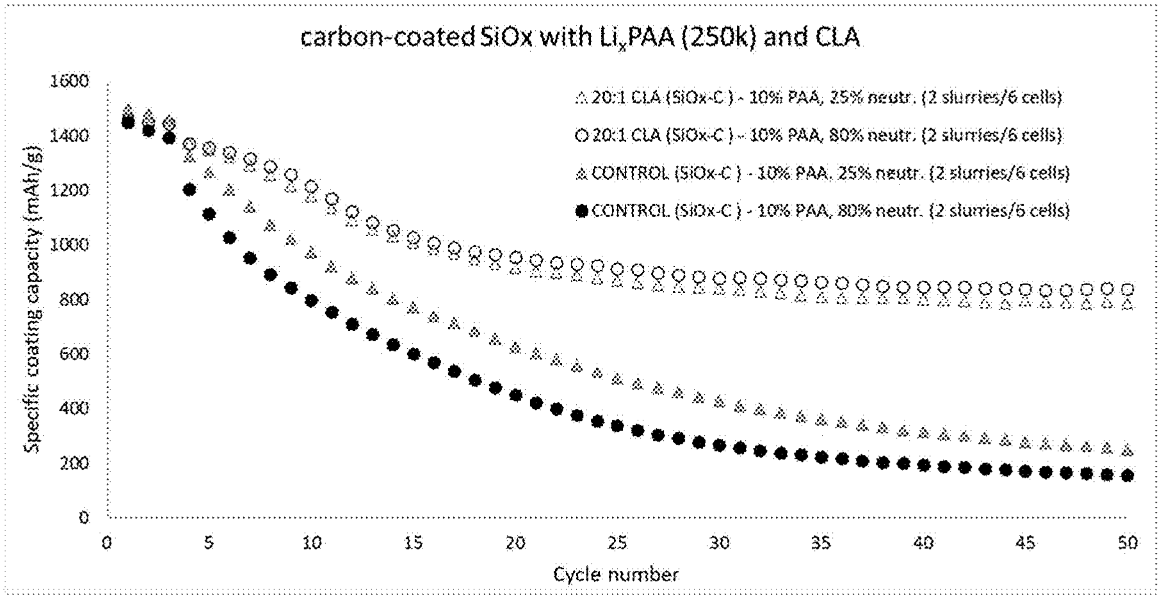
FIG. 15 shows the electrochemical cycling performance of lithium-ion coin cells with an electrode composition containing carbon-coated silicon oxide particles in half-cell configuration with two levels of PAA neutralisation. The cycling graphs for electrodes without (Control) and with metal complex (Solution 6) at a 20:1 ratio are depicted.

FIG. 15 shows the electrochemical cycling performance of lithium-ion coin cells with an electrode composition of carbon-coated silicon oxide/C65/$Li_xPAA$ (250 kDa) (x=0.25, 0.5, 0.8) 80/10/10 wt % in 1M $LiPF_6$ in EC/EMC/DEC (3/5/2 vol %)+1 wt % VC+10 wt % FEC in half-cell configuration. The cycling graphs for electrodes without (control) and with metal complex (Solution 6) at a 20:1 ratio are depicted showing little difference with PAA neutralisation in the case of metal complex added cells.

Example 6c. Using Anodes with μSi Particles and Alginate Binder

In this example an electrode slurry with a composition of 70/15/15 micro-silicon/conductive aid/binder was prepared. A 4 wt % aqueous solution of 1.2 g sodium alginate, medium viscosity (Sigma Aldrich, USA), was prepared by dissolving sodium alginate in deionized water. 30 g of the alginate solution were mixed with 1.2 g of C65 on a Thinky ARE-250/310 mixer for 2×2 minutes at 2,000 rpm. 5.6 g of micro-silicon (supplied by SFS) was added and the mixture mixed 2×2 minutes at 2,000 rpm. The mixture was transferred to a "Dispermat" over-head stirrer and mixed at 6,000 rpm. 12.1 g of metal complex (Solution 6) were added dropwise, and the mixture kept mixing for further 5 minutes. In the case of the Control, water was added dropwise. The slurry was applied to a copper current collector foil and coated with a doctor blade at a height of 140 μm. The coating was dried at 60° C. for 10 minutes. The slurry remained processable without signs of gelation or thickening throughout processing.

Electrodes were calendered, cut, and dried up to 110° C. under vacuum for coin cell assembly and tested as previously described. Three replicate cells were made and tested for each condition.

Figure 16:
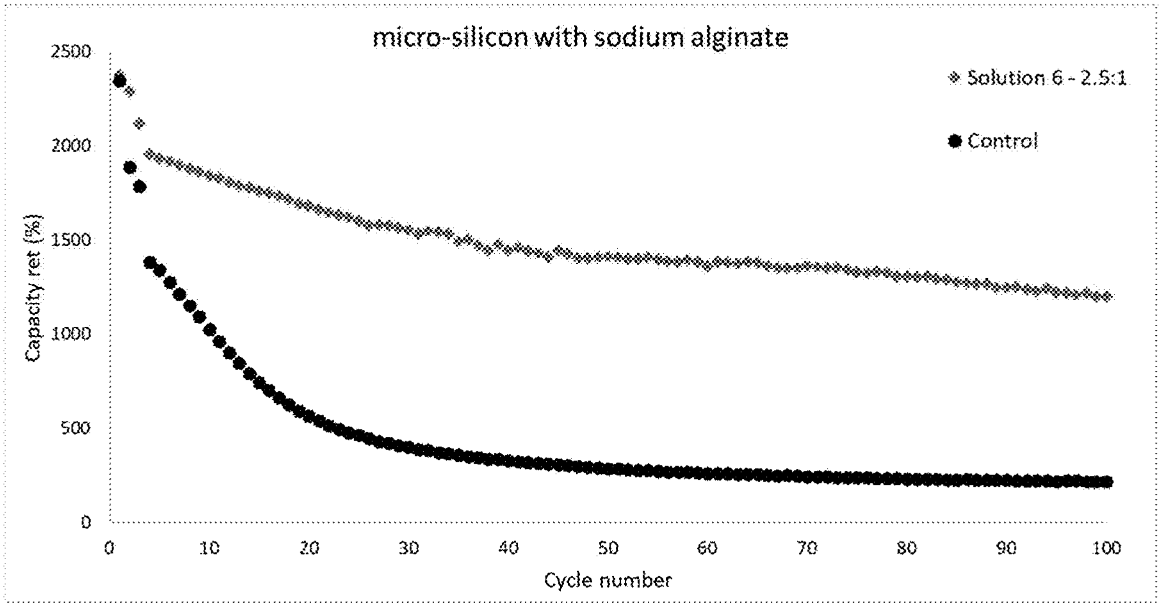
FIG. 16 shows the electrochemical cycling performance of lithium-ion coin cells with an electrode composition containing micro-silicon in half-cell configuration. The cycling graphs for electrodes without (Control) and with metal complex (Solution 6) at a 2.5:1 ratio are depicted.

FIG. 16 shows the electrochemical cycling performance of lithium-ion coin cells with an electrode composition of micro-silicon/C65/sodium alginate 70/15/15 wt % in 1M $LiPF_6$ in EC/EMC/DEC (3/5/2 vol %)+1 wt % VC+10 wt % FEC in half-cell configuration. The cycling graphs for electrodes without (Control) and with metal complex (Solution 6) are depicted.

Example 6d. Using Anodes with Graphite

In this example an electrode slurry with a composition 98/2 graphite/binder was prepared. A 1.7 wt % aqueous solution of 0.6 g sodium CMC (supplied by MTI) was prepared by dissolving sodium CMC in deionized water. 29.4 g graphite were added and the mixture mixed on a "Dispermat" over-head stirrer for 10 minutes at 6,000 rpm. Different quantities of the metal complex (Solution 4, pH 3.0) were then added dropwise and mixed for a further 5 mins. In the case of the Control, water was added dropwise and then 3 mL of the slurry were applied to a copper current collector foil and coated with a doctor blade at a height of 130 μm. The coating was dried at 60° C. for 10 minutes. The viscosity of the slurry did not change for 2 h, after which it increased.

Electrodes were calendered, cut, and dried up to 110° C. under vacuum for coin cell assembly. Lithium (Li) metal was used as the counter electrode and 1M $LiPF_6$ in EC/EMC/DEC (3/5/2 vol %)+1 wt % VC+10 wt % FEC was used was electrolyte for the coin cell assembly. For charge/discharge cycling tests, the coin cells were activated at 0.05 C (1 C=360 mA/g) for 1 cycle and at 0.1 C for 2 cycles, and then cycled at 0.5 C for long term stability testing. The C rates were based on the mass of active material (graphite) in the electrodes. The voltage range for charge/discharge tests was 0.005-1.5 V vs. Li. The charge/discharge tests were conducted on Neware multi-channel battery testers controlled by a computer. Three replicate cells were made and tested for each condition.

Figure 17:
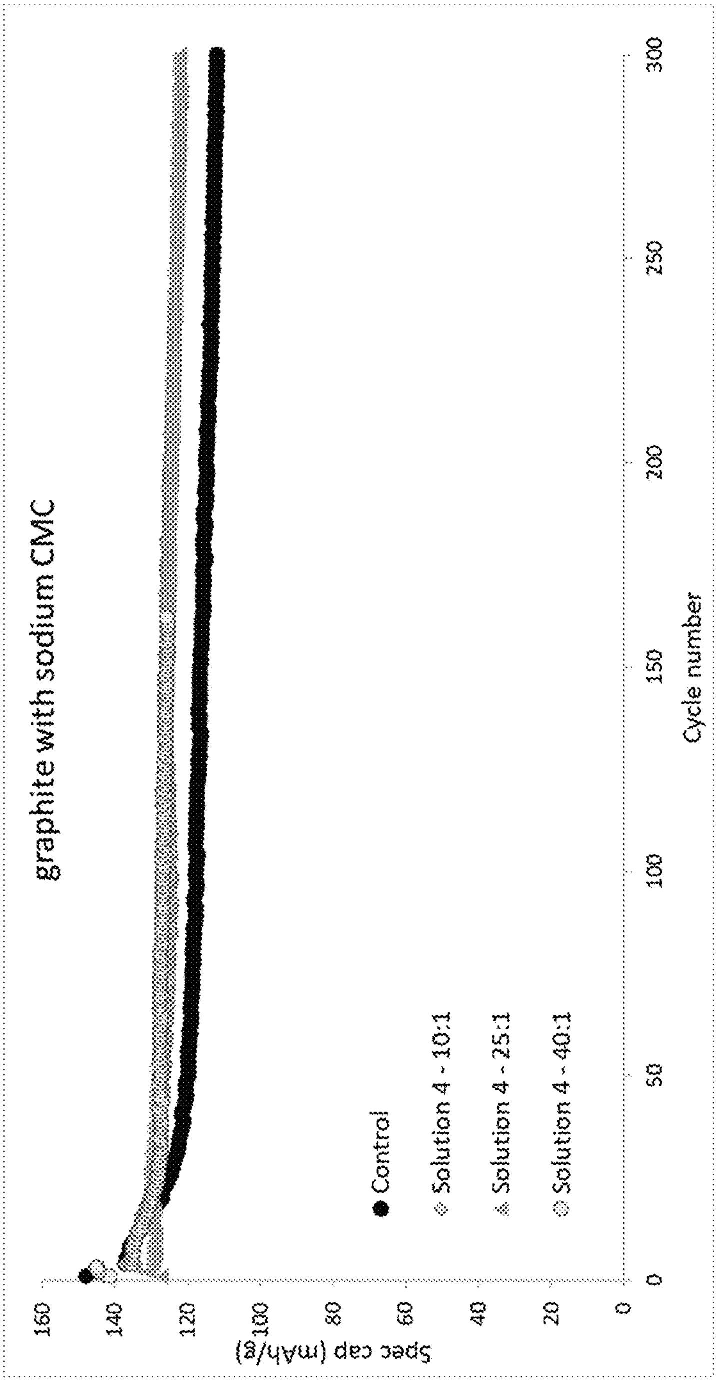
FIG. 17 shows the electrochemical cycling performance of lithium-ion coin cells with an anode composition of graphite/NaCMC 98/2 wt % with a NMC 532 cathode. The cycling graphs for electrodes without (Control) and with metal complex (Solution 4) at three different ratios are depicted.

FIG. 17 shows the electrochemical cycling performance of lithium-ion coin cells with an anode composition of graphite/NaCMC 98/2 wt % in 1M $LiPF_6$ in EC/EMC/DEC (3/5/2 vol %)+1 wt % VC+10 wt % FEC in full-cell configuration with a NMC 532 cathode. The cycling graphs for electrodes without (Control) and with metal complex (Solution 4) at three different ratios are depicted.

The invention claimed is:

1. A method of forming a cured conductive binder material, comprising:

(i) providing a liquid formulation comprising:

a liquid carrier, at least one active material, wherein the at least one active material is selected from:

silicon, silicon-containing materials (its oxides, composites, and alloys), tin, a tin-containing material (its oxides, composites, and alloys), germanium, germanium-containing material (its oxides, composites, and alloys), metal oxides, ceramics, carbon, and graphite; or those comprising sulphur, LiFePO4 (LFP), mixed metal oxides which include cobalt, lithium, nickel, iron and/or manganese, phosphorus, aluminum, titanium and carbon, at least one polymeric binder, and at least one modified metal coordination complex, wherein the metal ion of the metal coordination complex is selected from the group consisting of chromium, ruthenium, titanium, iron, cobalt, aluminum, zirconium, and rhodium, and wherein the modified metal coordination complex comprises a capping group selected from the group consisting of formate, acetate, propionate, oxalate, malonate, succinate, maleate, citrate, sulphate, phosphate, an amino acid, and hydroxyacetate; and (ii) curing the liquid formulation of step (i), to thereby form a cured conductive binder material, wherein the at least one modified metal coordination complex is added to the liquid carrier such that it is simultaneously exposed to both the at least one active material and the at least one polymeric binder.

2. The method of claim 1, wherein the cured conductive binder material comprises dative bonds between the metal of the at least one modified metal coordination complex and both the at least one active material and the at least one polymeric binder.

3. The method of claim 1 wherein the method further includes the step of controlling the reaction pH and/or temperature and/or mixing and/or relative concentrations of the at least one active material and/or modified metal coordination complex and/or at least one polymeric binder, when the three components are exposed to one another.

4. The method of claim 1 wherein the method further comprises the step of forming a modified oligomeric metal coordination complex.

5. The method of claim 1 wherein the at least one modified metal coordination complex is a metal coordination complex formed at a pH below 3.8.

6. The method of claim 1 wherein the capping group of the at least one modified metal coordination complex and the at least one polymeric binder comprise the same functional group, wherein the at least one polymeric binder comprises a greater number of said functional group than the ligand.

7. The method of claim 1 wherein the at least one active material has a surface which includes a nitrogen, oxygen, sulfur, hydroxyl, or carboxylic acid species.

8. The method of claim 1 wherein the polymeric binder comprises an oxygen species selected from acrylate, carboxyl, hydroxyl, and carbonyl moieties.

9. The method of claim 1 wherein the polymeric binder is selected from the group consisting of: polyvinylpyrrolidone, carboxymethyl cellulose (CMC), polyacrylic acid (PAA), poly(methacrylic acid), maleic anhydride copolymers including poly(ethylene and maleic anhydride) copolymers, polyvinyl alcohol, alginic acid salts, carboxymethyl chitosan, natural polysaccharide, Xanthan gum, Guar gum, Arabic gum, alginate, and polyimide.

10. A method of forming a cured conductive binder material, comprising:

(i) providing a liquid formulation comprising:

a liquid carrier, at least one active material, wherein the at least one active material is selected from: silicon, silicon-containing materials (its oxides, composites, and alloys), metal oxides, ceramics, carbon, and graphite;

at least one polymeric binder, and at least one modified metal coordination complex, wherein the metal ion of the metal coordination complex is selected from the group consisting of chromium, ruthenium, and iron, and wherein the modified metal coordination complex comprises a capping group selected from the group consisting of acetate, oxalate, malonate, succinate, maleate, and citrate; and (ii) curing the liquid formulation of step (i), to thereby form a cured conductive binder material, wherein the at least one modified metal coordination complex is added to the liquid carrier such that it is simultaneously exposed to both the at least one active material and the at least one polymeric binder.

11. The method of claim 10 wherein the at least one active material is silicon or a silicon-containing material, the metal ion of the metal coordination complex is chromium, and the capping group is selected from acetate, oxalate and citrate.

12. A method of forming a cured conductive binder material, comprising:

(i) providing a liquid formulation comprising:

a liquid carrier, at least one active material which is silicon or a silicon-containing material (its oxides, composites, and alloys);

at least one polymeric binder selected from the group consisting of: polyvinylpyrrolidone, carboxymethyl cellulose (CMC), and polyacrylic acid (PAA), and at least one modified metal coordination complex, wherein the metal ion of the metal coordination complex is chromium, and wherein the modified metal coordination complex comprises an acetate capping group; and (ii) curing the liquid formulation of step (i), to thereby form a cured conductive binder material, wherein the at least one modified metal coordination complex is added to the liquid carrier such that it is simultaneously exposed to both the at least one active material and the at least one polymeric binder.

* * * * *